(12) United States Patent
Murugesan et al.

(10) Patent No.: US 11,886,153 B2
(45) Date of Patent: Jan. 30, 2024

(54) BUILDING CONTROL SYSTEM USING REINFORCEMENT LEARNING

(71) Applicant: Johnson Controls Tyco IP Holdings LLP, Milwaukee, WI (US)

(72) Inventors: Sugumar Murugesan, Santa Clara, CA (US); Young M. Lee, Old Westbury, NY (US); Viswanath Ramamurti, San Leandro, CA (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 97 days.

(21) Appl. No.: 17/383,213

(22) Filed: Jul. 22, 2021

(65) Prior Publication Data
US 2022/0026864 A1    Jan. 27, 2022

Related U.S. Application Data

(60) Provisional application No. 63/055,781, filed on Jul. 23, 2020.

(51) Int. Cl.
*G05B 13/04*    (2006.01)
*H02J 3/00*    (2006.01)
(Continued)

(52) U.S. Cl.
CPC ......... *G05B 13/048* (2013.01); *G05B 13/027* (2013.01); *G05B 13/041* (2013.01);
(Continued)

(58) Field of Classification Search
CPC ..... G05B 13/048; G05B 13/041; H02J 3/003; G06N 3/045; G06N 3/08
See application file for complete search history.

(56) References Cited

U.S. PATENT DOCUMENTS 9,447,985 B2    9/2016    Johnson
10,402,723 B1    9/2019    Silberman et al.
(Continued)

FOREIGN PATENT DOCUMENTS

CA    2957726 A1    3/2016
CA    3043996 A1    2/2018
(Continued)

OTHER PUBLICATIONS

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
(Continued)

*Primary Examiner* — Gary Collins
(74) *Attorney, Agent, or Firm* — Foley & Lardner LLP

(57) ABSTRACT

A method of operating a building management system is disclosed. The method includes determining, by a processing circuit, policy rankings for a plurality of control policies based on building operation data of a first previous time period, selecting, by the processing circuit, a set of control policies from among the plurality of control policies based on the policy rankings of the set of control policies satisfying a ranking threshold, generating, by the processing circuit, a plurality of prediction models for the set of control policies, selecting, by the processing circuit, a first prediction model of the plurality of prediction models based on building operation data of a second previous time period, and responsive to selecting the first prediction model, operating, by the processing circuit, the building management system using the first prediction model.

20 Claims, 13 Drawing Sheets

(51) Int. Cl.
    G06N 3/08      (2023.01)
    G05B 13/02     (2006.01)
    G06N 3/045     (2023.01)
(52) U.S. Cl.
    CPC ............... *G06N 3/045* (2023.01); *G06N 3/08* (2013.01); *H02J 3/003* (2020.01)

(56) References Cited

U.S. PATENT DOCUMENTS

| | | | |
|---|---|---|---|
| 10,465,931 B2 | 11/2019 | Barrett | |
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 2010/0305718 A1* | 12/2010 | Clark .................... | G05B 15/02 700/17 |
| 2011/0231320 A1 | 9/2011 | Irving | |
| 2014/0337256 A1* | 11/2014 | Varadi .................... | G05B 13/04 706/12 |
| 2015/0178865 A1 | 6/2015 | Anderson et al. | |
| 2016/0305678 A1* | 10/2016 | Pavlovski .............. | G05B 15/02 |
| 2017/0315523 A1* | 11/2017 | Cross .................... | G05B 17/02 |
| 2018/0375444 A1 | 12/2018 | Gamroth | |
| 2021/0180891 A1* | 6/2021 | Rousselet ................ | F24F 11/70 |
| 2022/0026864 A1 | 1/2022 | Murugesan et al. | |
| 2022/0373209 A1 | 11/2022 | Ko | |

FOREIGN PATENT DOCUMENTS

| | | |
|---|---|---|
| EP | 3 186 687 A4 | 7/2017 |
| EP | 3 497 377 A1 | 6/2019 |

OTHER PUBLICATIONS

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved f rom internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943,

(56) References Cited

OTHER PUBLICATIONS filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Afram, et al., "Artificial neural network (ANN) based model predictive control (MPC) and optimization of HVAC systems: A state of the art review and case study of a residential HVAC system," Energy and Buildings, 141, 2017, pp. 96-113.
Afram, et al., "Theory and applications of HVAC control systems—A review of model predictive control (MPC)," Building and Environment, 72, 2014, pp. 343-355.
Bengea, et al. "Model predictive control for mid-size commercial building hvac: Implementation, results and energy savings," Second International Conference on Building Energy and Environment, 2012, pp. 979-986.
Bingqing, et al., "Gnu-RL: A Precocial Reinforcement Learning Solution for Building HVAC Control Using a Differentiable MPC Policy," Proceedings of the 6th ACM International Conference on Systems for Energy-Efficient Buildings, Cities, and Transportation, 2019, pp. 316-325.
Cannon, "Efficient nonlinear model predictive control algorithms," Annual Reviews in Control 28, 2, 2004, 229-237.
EIA—US Energy Information Administration, "Annual Energy Outlook 2018," Feb. 6, 2018, 74 pages.
Eini, et al., "Learning-based Model Predictive Control for Smart Building Thermal Management," 2019 IEEE 16th International Conference on Smart Cities: Improving Quality of Life Using ICT & IoT and AI (HONET-ICT), 2019, 5 pages.
El Sallab, et al., "Deep reinforcement learning framework for autonomous driving," Electronic Imaging, 19, 2017, pp. 70-76.
Erickson, et al., "Occupancy Based Demand Response HVAC Control Strategy," BuildSys 2010, Nov. 2, 2010, 7 pages.
Gao, et al., "Energy-Efficient Thermal Comfort Control in Smart Buildings via Deep Reinforcement Learning," arXiv preprint arXiv: 1901.04693, 2019, 11 pages.
Gros, et al., "From Linear to Nonlinear MPC: Bridging the Gap via the Real-Time Iteration," International Journal of Control 93, 1, 2020, pp. 62-80.
Gu, et al. "Deep Reinforcement Learning for Robotic Manipulation with Asynchronous Off-Policy Updates," IEEE International Conference on Robotics and Automation (ICRA), 2017, pp. 3389-3396.
Hausknecht, et al., "Deep Recurrent Q-Learning for Partially Observable MDPs," AAAI Fall Symposium Series, 2015, 9 pages.
Henderson, et al., "Deep Reinforcement Learning that Matters," The Thirty-Second AAAI Conference on Artificial Intelligence, 2018, pp. 3207-3214.
Henze, et al., "Evaluation of Optimal Control for Active and Passive Building Thermal Storage," International Journal of Thermal Sciences, 43, 2, 2004, pp. 173-183.
Huang, et al., "Model Predictive Control for Energy-Efficient Buildings: An Airport Terminal Building Study," 11th IEEE International Conference on Control & Automation (ICCA), 2014, 6 pages.
Jain, et al., "NeurOpt: Neural Network Based Optimization for Building Energy Management and Climate Control," arXiv preprint arXiv: 2001.07831, 2020, 12 pages.
Jia, et al., "Advanced Building Control via Deep Reinforcement Learning," Energy Procedia, 158, Feb. 2019, pp. 6158-6163.
Kaelbling, et al., "Reinforcement Learning: A Survey," Journal of Artificial Intelligence Research, 4, 1996, pp. 237-285.
Killian, et al., "Ten Questions Concerning Model Predictive Control for Energy Efficient Buildings," Building and Environment, 105, 2016, pp. 403-412.
Kircher, et al., "Model Predictive Control of Thermal Storage for Demand Response," 2015 American Control Conference (ACC), 2015, 6 pages.
LeCun, et al., "Deep Learning," Nature, 521, May 28, 2015, pp. 436-444.
Li, et al., "Deep Reinforcement Learning: An Overview," arXiv preprint arXiv:1701.07274, 2017, 2 pages.
Li, et al., "Review of Building Energy Modeling for Control and Operation," Renewable and Sustainable Energy Reviews, 37, 2014, pp. 517-537.
Li, et al., "Transforming Cooling Optimization for Green Data Center via Deep Reinforcement Learning," IEEE Transactions on Cybernetics, 50, 5, May 2020, 11 pages.
Lu, et al., "Modeling and Forecasting Energy Consumption for Heterogeneous Buildings Using a Physical-Statistical Approach," Applied Energy, 144(C), 2015, pp. 261-275.
Ma, et al., "Demand Reduction in Building Energy Systems Based on Economic Model Predictive Control," Chemical Engineering Science 67, 1, Jan. 1, 2012, 92-100.
Ma, et al., "Economic model predictive control for building energy systems," ISGT 2011, Jan. 17-19, 2011, 12 pages.
Ma, et al., "Model Predictive Control for the Operation of Building Cooling Systems," IEEE Transactions on Control Systems Technology, 20, 3, May 3, 2012, pp. 796-803.
Ma, et al., "Stochastic Model Predictive Control for Building HVAC Systems: Complexity and Conservatism," IEEE Transactions on Control Systems Technology, 23, 1, 2014, 16 pages.
Mnih, et al., "Playing Atari with Deep Reinforcement Learning," arXiv preprint arXiv: 1312.5602, 2013, 9 pages.
Nagy, et al., "Deep Reinforcement Learning for Optimal Control of Space Heating," arXiv preprint arXiv: 1805.03777, 2018, 8 pages.
Oldewurtel, et al., "Use of Model Predictive Control and Weather Forecasts for Energy Efficient Building Climate Control," Energy and Buildings, 45, Feb. 2012, pp. 15-27.
Privara, et al., "Building Modeling as a Crucial Part for Building Predictive Control," Energy and Buildings, 56 Jan. 2013, pp. 8-22.
Risbeck, et al., "Economic Model Predictive Control for Time-Varying Cost and Peak Demand Charge Optimization," IEEE Trans. Automat. Control, 65, 7, Jul. 2020, 3 pages.
Schaul, et al. "Prioritized Experience Replay," arXiv preprint arXiv: 1511.05952, 2015, 21 pages.
Smarra, et al., "Data-Driven Model Predictive Control Using Random Forests for Building Energy Optimization and Climate Control," Applied Energy, 226, 2018, pp. 1252-1272.
Sutton, R., "Introduction to Reinforcement Learning," Reinforcement Learning and Artificial Intelligence Laboratory, Department of Computer Science, University of Alberta, Canada, 1998, 20 pages.
Van Cutsem, et al., "Comparison of MPC Formulations for Building Control under Commercial Time-of-Use Tariffs," IEEE PowerTech Milan 2019, 2019, 7 pages.
Van Hasselt, et al., "Deep Reinforcement Learning With Double Q-Learning," Proceedings of the Thirtieth AAAI Conference on Artificial Intelligence (AAAI-16), 2016, 7 pages.
Van Staden, et al., "A Model Predictive Control Strategy for Load Shifting in a Water Pumping Scheme with Maximum Demand Charges," Applied Energy 88, 12, Dec. 2011, pp. 4785-4794.
Vinyals, et al., "Starcraft II: A New Challenge for Reinforcement Learning," Arxiv Preprint Arxiv:1708.04782, 2017, 20 pages.
Wang, et al., "Datadriven Model Predictive Control for Building Climate Control: Three Case Studies on Different Buildings," Building and Environment, 160, 2019, 12 pages.
Wang, et al., "Fast Model Predictive Control Using Online Optimization," IEEE Transactions on Control Systems Technology, 18, 2, Mar. 2010, pp. 267-278.
Wei, et al., "Deep Reinforcement Learning for Building HVAC Control," In Proceedings of the 54th Annual Design Automation Conference 2017, Institute of Electrical and Electronics Engineers, Inc., Jun. 18, 2017, 3 pages.
Yang, et al., "HVAC Energy Cost Optimization for a Multizone Building via a Decentralized Approach," IEEE Transactions on Automation Science and Engineering, 2020, 13 pages.
Yang, et al., "Model Predictive Control with Adaptive Machine-Learning-Based Model for Building Energy Efficiency and Comfort Optimization," Applied Energy, 271, 2020, 16 pages.
Zhang, et al., "Building HVAC Scheduling Using Reinforcement Learning via Neural Network Based Model Approximation," Buildsys'19, Nov. 13-14, 2019, 10 pages.

(56) References Cited

OTHER PUBLICATIONS

Zhang, et al., "Whole Building Energy Model for HVAC Optimal Control: A Practical Framework Based on Deep Reinforcement Learning," Energy and Buildings, 199, Sep. 15, 2019, pp. 472-490.
Zou, et al., "Towards Optimal Control of Air Handling Units Using Deep Reinforcement Learning and Recurrent Neural Network," Building and Environment, 168, Jan. 15, 2020, 3 pages.

\* cited by examiner

BUILDING CONTROL SYSTEM USING REINFORCEMENT LEARNING

CROSS-REFERENCE TO RELATED PATENT APPLICATIONS

The present application claims priority to and the benefit of U.S. Provisional Patent Application No. 63/055,781, filed Jul. 23, 2020, which is incorporated herein by reference in its entirety.

BACKGROUND

The present disclosure relates generally to the field of building automation systems. A building automation system (BAS) is, in general, a system of devices configured to control, monitor, and manage equipment in or around a building or building area. The BAS system may include one or more HVAC devices, which control and regulate various environmental factors within a building. Environmental factors may include temperature, humidity, etc. Often, these environmental factors are associated with providing a comfort level for one or more occupants of the building. Many BAS systems operate to control the environmental factor based on certain setpoints. However, various factors may adversely affect the ability of the BAS to regulate the environmental factors, requiring setpoint or other changes to the system. Further, these factors may result in a user modifying the operation of the BAS to obtain the quality level they desire.

SUMMARY

In one aspect, a building management system is disclosed. The building management system includes one or more memory devices configured to store instructions thereon that, when executed by one or more processors, cause the one or more processors to: determine policy rankings for a plurality of control policies based on building operation data of a first previous time period; select a set of control policies from among the plurality of control policies based on the policy rankings of the set of control policies satisfying a ranking threshold; generate a plurality of prediction models for the set of control policies; select a first prediction model of the plurality of prediction models based on building operation data of a second previous time period; and responsive to selecting the first prediction model, operate the building management system using the first prediction model.

In some embodiments, the plurality of prediction models includes reinforcement learning models, and the plurality of control policies includes one or more state-spaces for the reinforcement learning models.

In some embodiments, the one or more state-spaces includes one or more of outside air temperature, occupancy, zone-air temperature, or cloudiness.

In some embodiments, the state-spaces include time-step forecasts for environmental variables.

In some embodiments, the plurality of control policies includes one or more action spaces, the one or more action-spaces includes one or more of a potential zone-air temperature setpoints.

In some embodiments, the policy rankings are determined based on a total amount of energy consumption over the first previous time period.

In some embodiments, the policy rankings are determined based on a total amount of money spent on operating building equipment over the first previous time period.

In some embodiments, the selecting the building operation data is based on one or both of simulated data or real-time building operation data.

Another aspect is a method for generating a prediction model for control of a building management system. The method includes determining, by a processing circuit, policy rankings for a plurality of control policies based on building operation data of a first previous time period; selecting, by the processing circuit, a set of control policies from among the plurality of control policies based on the policy rankings of the set of control policies satisfying a ranking threshold; generating, by the processing circuit, a plurality of prediction models for the set of control policies; selecting, by the processing circuit, a first prediction model of the plurality of prediction models based on building operation data of a second previous time period; and responsive to selecting the first prediction model, operating, by the processing circuit, the building management system using the first prediction model.

In some embodiments, the plurality of prediction models includes reinforcement learning models, the plurality of control policies includes one or more state-spaces for the reinforcement learning models, and the policy rankings is determined based on a combination of state-space complexity, action-space complexity, and/or reward performance.

In some embodiments, a higher number of parameters used to determine the one or more state spaces corresponds to a greater state-space complexity, and a higher number of actions corresponds to a greater action-space complexity.

In some embodiments, a higher reward performance is based on one or more of energy consumption, total comfortability, or total number of errors.

In some embodiments, the plurality of control policies include known baseline policies.

In some embodiments, the building operation data includes one or more of current values, previous values, or forecasts for various points of a space of a building operatively connected to the processing circuit.

In some embodiments, the building operation data includes total energy consumption or average comfortability.

Another aspect is a building management system including: building equipment operatively connected to one or more processors; and one or more memory devices configured to store instructions thereon that, when executed by the one or more processors, cause the one or more processors to: determine policy rankings for a plurality of control policies based on building operation data of a first previous time period; select a set of control policies from among the plurality of control policies based on the policy rankings of the set of control policies satisfying a ranking threshold; generate a plurality of prediction models for the set of control policies; select a first prediction model of the plurality of prediction models based on building operation data of a second previous time period; and responsive to selecting the first prediction model, operate the building equipment using the first prediction model.

In some embodiments, the plurality of prediction models includes reinforcement learning models, and the plurality of control policies includes one or more state-spaces for the reinforcement learning models.

In some embodiments, the one or more state-spaces includes one or more of outside air temperature, occupancy, zone-air temperature, or cloudiness.

In some embodiments, the state-spaces include time-step forecasts for environmental variables.

In some embodiments, the plurality of control policies includes one or more action spaces, and the one or more action-spaces includes one or more of a potential zone-air temperature setpoints.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the figures, a building system with an environmental control system is shown, according to an exemplary embodiment.

Building Management System and HVAC System

Figure 1:
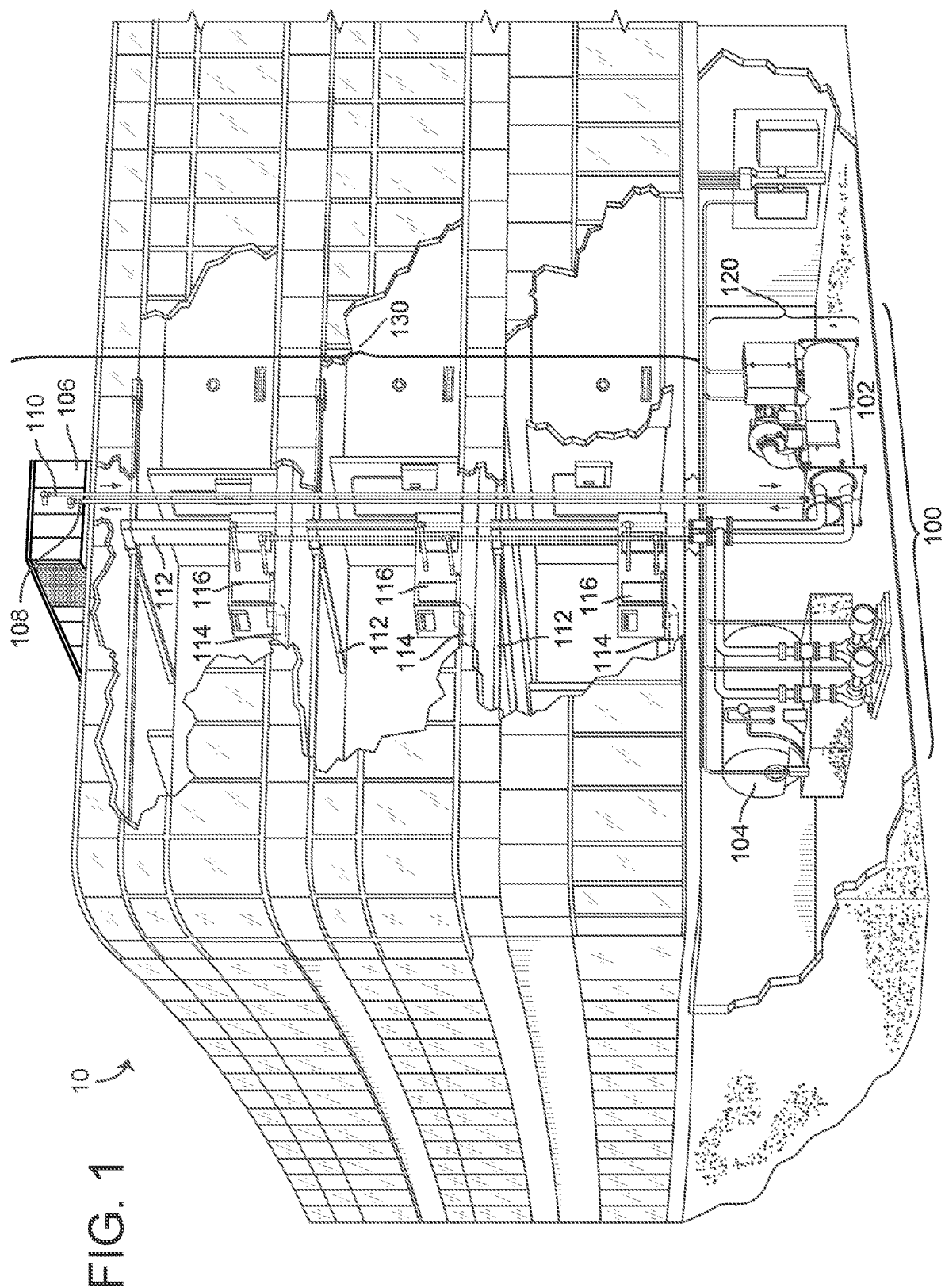
FIG. 1 is a drawing of a building equipped with an HVAC system, according to an exemplary embodiment.

Referring now to FIG. 1, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
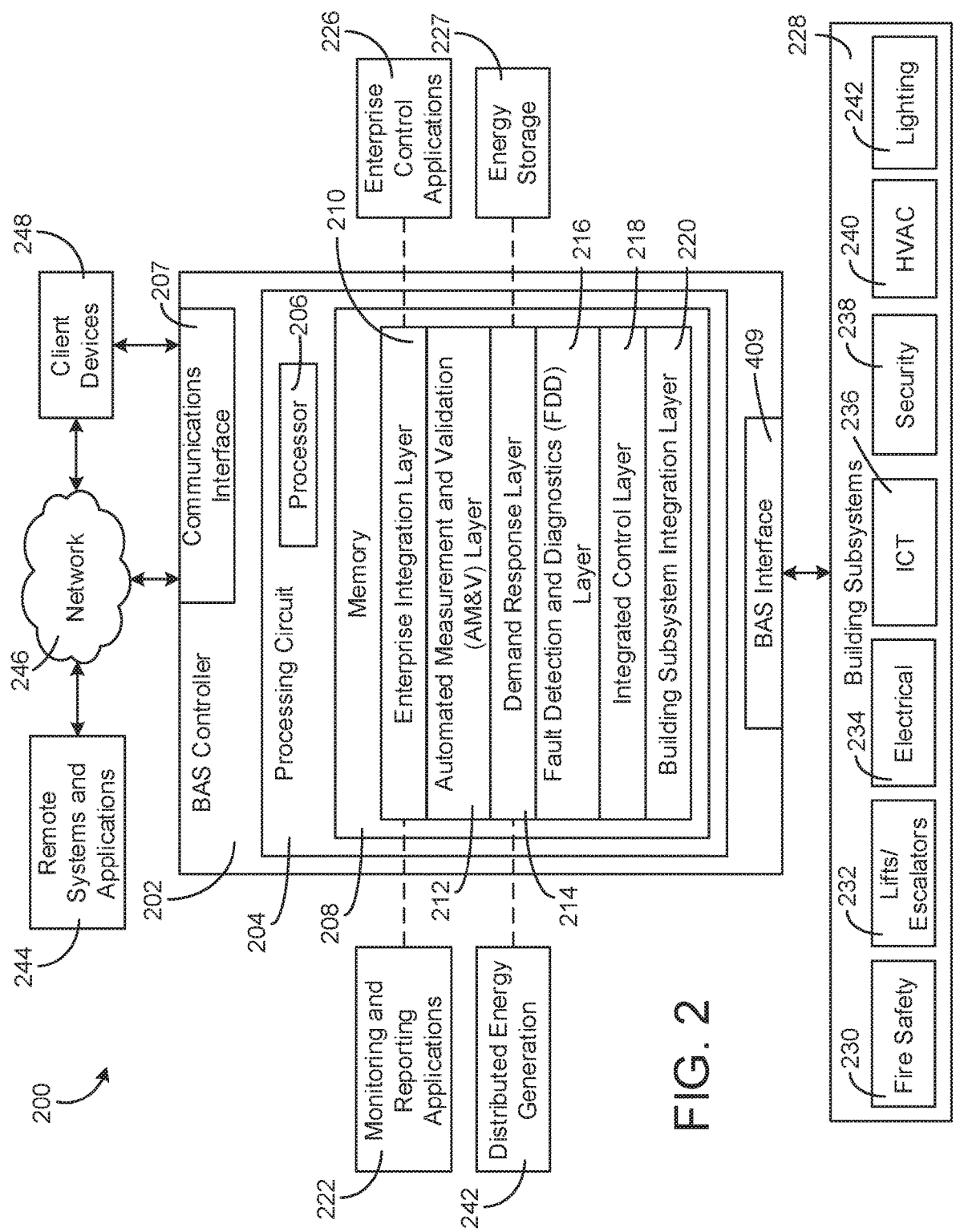
FIG. 2 is a block diagram of a building automation system (BAS) that may be used to monitor and/or control the building of FIG. 1, according to an exemplary embodiment.

Referring now to FIG. 2, a block diagram of a building automation system (BAS) 200 is shown, according to an exemplary embodiment. BAS 200 can be implemented in building 10 to automatically monitor and control various building functions. BAS 200 is shown to include BAS controller 202 and a plurality of building subsystems 228. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 228 include a waterside system and/or an airside system. A waterside system and an airside system are described with further reference to U.S. patent application Ser. No. 15/631,830 filed Jun. 23, 2017, the entirety of which is incorporated by reference herein.

Each of building subsystems 228 can include any number of devices, controllers, and connections for completing its individual functions and control activities. HVAC subsystem 240 can include many of the same components as HVAC system 100, as described with reference to FIG. 1. For example, HVAC subsystem 240 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 242 can include any number of light fixtures, ballasts, lighting sensors, dimmers, or other devices configured to controllably adjust the amount of light provided to a building space. Security subsystem 238 can include occupancy sensors, video surveillance cameras, digital video recorders, video processing servers, intrusion detection devices, access control devices and servers, or other security-related devices.

Still referring to FIG. 2, BAS controller 266 is shown to include a communications interface 207 and a BAS interface 209. Interface 207 can facilitate communications between BAS controller 202 and external applications (e.g., monitoring and reporting applications 222, enterprise control applications 226, remote systems and applications 244, applications residing on client devices 248, etc.) for allowing user control, monitoring, and adjustment to BAS controller 266 and/or subsystems 228. Interface 207 can also facilitate communications between BAS controller 202 and client devices 248. BAS interface 209 can facilitate communications between BAS controller 202 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 can be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a Wi-Fi transceiver for communicating via a wireless communications network. In another example, one or both of interfaces 207, 209 can include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 202 is shown to include a processing circuit 204 including a processor 206 and memory 208. Processing circuit 204 can be communicably connected to BAS interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to an exemplary embodiment, memory 208 is communicably connected to processor 206 via processing circuit 204 and includes computer code for executing (e.g., by processing circuit 204 and/or processor 206) one or more processes described herein.

In some embodiments, BAS controller 202 is implemented within a single computer (e.g., one server, one housing, etc.). In various other embodiments BAS controller 202 can be distributed across multiple servers or computers (e.g., that can exist in distributed locations).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration later 220. Layers 210-220 is configured to receive inputs from building subsystems 228 and other data source providers, determine optimal control actions for building subsystems 228 based on the inputs, generate control signals based on the optimal control actions, and provide the generated control signals to building subsystems 228 in some embodiments. The following paragraphs describe some of the general functions performed by each of layers 210-220 in BAS 200.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 can also or alternatively be configured to provide configuration GUIs for configuring BAS controller 202. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 can be configured to manage communications between BAS controller 202 and building subsystems 228. For example, building subsystem integration layer 220 can receive sensor data and input signals from building subsystems 228 and provide output data and control signals to building subsystems 228. Building subsystem integration layer 220 can also be configured to manage communications between building subsystems 228. Building subsystem integration layer 220 translate communications (e.g., sensor data, input signals, output signals, etc.) across a plurality of multi-vendor/multi-protocol systems.

Demand response layer 214 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 224, from energy storage 227, or from other sources. Demand response layer 214 can receive inputs from other layers of BAS controller 202 (e.g., building subsystem integration layer 220, integrated control layer 218, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 can also include control logic configured to determine when to utilize stored energy. For example, demand response layer 214 can determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 214 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 214 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable setpoint adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 218 can be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated supersystem. In an exemplary embodiment, integrated control layer 218 includes control logic that uses inputs and outputs from a plurality of building subsystems to provide greater comfort and energy savings relative to the comfort and energy savings that separate subsystems could provide alone. For example, integrated control layer 218 can be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 can be configured to enhance the effectiveness of demand response layer 214 by enabling building subsystems 228 and their respective control loops to be controlled in coordination with demand response layer 214. This configuration can reduce disruptive demand response behavior relative to conventional systems. For example, integrated control layer 218 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 can be configured to provide feedback to demand response layer 214 so that demand response layer 214 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 can be configured to provide calculated inputs (e.g., aggregations) to these higher levels based on outputs from more than one building subsystem.

Automated measurement and validation (AM&V) layer 212 can be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 can be based on building system energy models and/or equipment models for individual BAS devices or subsystems. For example, AM&V layer 212 can compare a model-predicted output with an actual output from building subsystems 228 to determine an accuracy of the model.

Fault detection and diagnostics (FDD) layer 216 can be configured to provide on-going fault detection for building subsystems 228, building subsystem devices (i.e., building equipment), and control algorithms used by demand response layer 214 and integrated control layer 218. FDD layer 216 can receive data inputs from integrated control layer 218, directly from one or more building subsystems or devices, or from another data source provider. FDD layer 216 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 216 can be configured to output a specific identification of the faulty component or cause of the fault (e.g., loose damper linkage) using detailed subsystem inputs available at building subsystem integration layer 220. In other exemplary embodiments, FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) can shut-down systems or direct control activities around faulty devices or systems to reduce energy waste, extend equipment life, or assure proper control response.

FDD layer 216 can be configured to store or access a variety of different system data stores (or data points for live data). FDD layer 216 can use some content of the data stores to identify faults at the equipment level (e.g., specific chiller, specific AHU, specific terminal unit, etc.) and other content to identify faults at component or subsystem levels. For example, building subsystems 228 can generate temporal (i.e., time-series) data indicating the performance of BAS 200 and the various components thereof. The data generated by building subsystems 228 can include measured or calculated values that exhibit statistical characteristics and provide information about how the corresponding system or process (e.g., a temperature control process, a flow control process, etc.) is performing in terms of error from its setpoint. These processes can be examined by FDD layer 216 to expose when the system begins to degrade in performance and alarm a user to repair the fault before it becomes more severe.

Building Control with Reinforcement Learning

Figure 3:
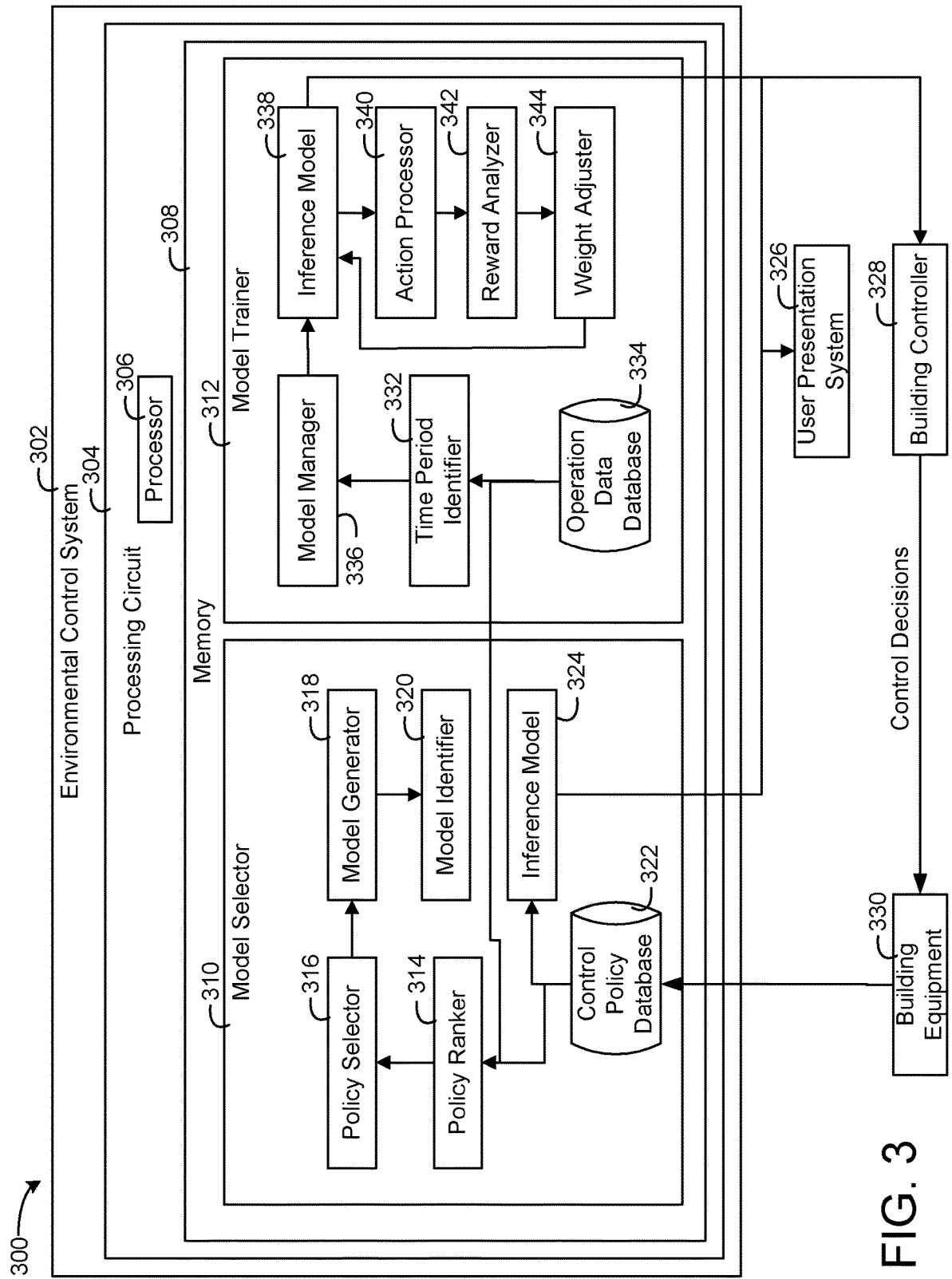
FIG. 3 is a block diagram of an environmental control system, according to an exemplary embodiment.

Referring now to FIG. 3, a block diagram of a system 300 including an environmental control system 302 that generates and trains prediction models (e.g., reinforcement learning models) to predict values for control variables or actions based on a current state of a building management system (e.g., BAS 200), according to an exemplary embodiment. Environmental control system 302 may generate a group of prediction models and select the prediction model that operates the most effectively (e.g., causes the building management system to use the least amount of energy while maintaining the comfort level of the building's occupants). Additionally, environmental control system 302 may use predetermined values for control variables for times within preset time periods to obtain values for performance variables and train a prediction model based on the obtained values. In addition to environmental control system 302, system 300 is shown to include a user presentation system 326, a building controller 328, and building equipment 330. Each of components 302 and 326-330 may communicate over a network (e.g., a synchronous or asynchronous network). Building controller 328 may be similar to or the same as BAS controller 202. Environmental control system 302 may be a component of or within building controller 328.

Environmental control system 302 may include a processing circuit 304, a processor 306, and a memory 308. Processor circuit 304, processor 306, and/or memory 308 can be the same as, or similar to, processing circuit 204, processor 206, and/or memory 208 as described with reference to FIG. 2. Memory 308 is shown to include a model selector 310 and a model trainer 312. Memory 308 may include any number of components. The model selector 310, model trainer 312, and their components are described with reference to FIGS. 3-5.

Model selector 310 can include instructions performed by one or more servers or processors (e.g., processing circuit 304), in some embodiments. In some embodiments, model selector 310 may include a policy ranker 314, a policy selector 316, a model generator 318, control policy database 322, and/or an inference model 324.

Model Trainer 312 can include instructions performed by one or more servers or processors (e.g., processing circuit 304), in some embodiments. In some embodiments, model trainer 312 can include a time period identifier 332, an operation data database 334, a model manager 336, an inference model 338, an action processor 340, a reward analyzer 342, and/or a weight adjuster 344.

As used herein, "points" or "data points" may refer to sensor inputs, control outputs, control values, and/or different characteristics of the inputs and/or outputs. "Points" and/or "data points" may refer to various data objects relating to the inputs and the outputs such as BACnet objects. The objects may represent and/or include a point and/or group of points. The object may include various properties for each of the points. For example, an analog input may be a particular point represented by an object with one or more properties describing the analog input and another property describing the sampling rate of the analog input. For example, in some embodiments, a point is a data representation associated with a component of a BMS, such as, a camera, thermostat, controller, VAV box, RTU, valve, damper, chiller, boiler, AHU, supply fan, etc.

Figure 4:
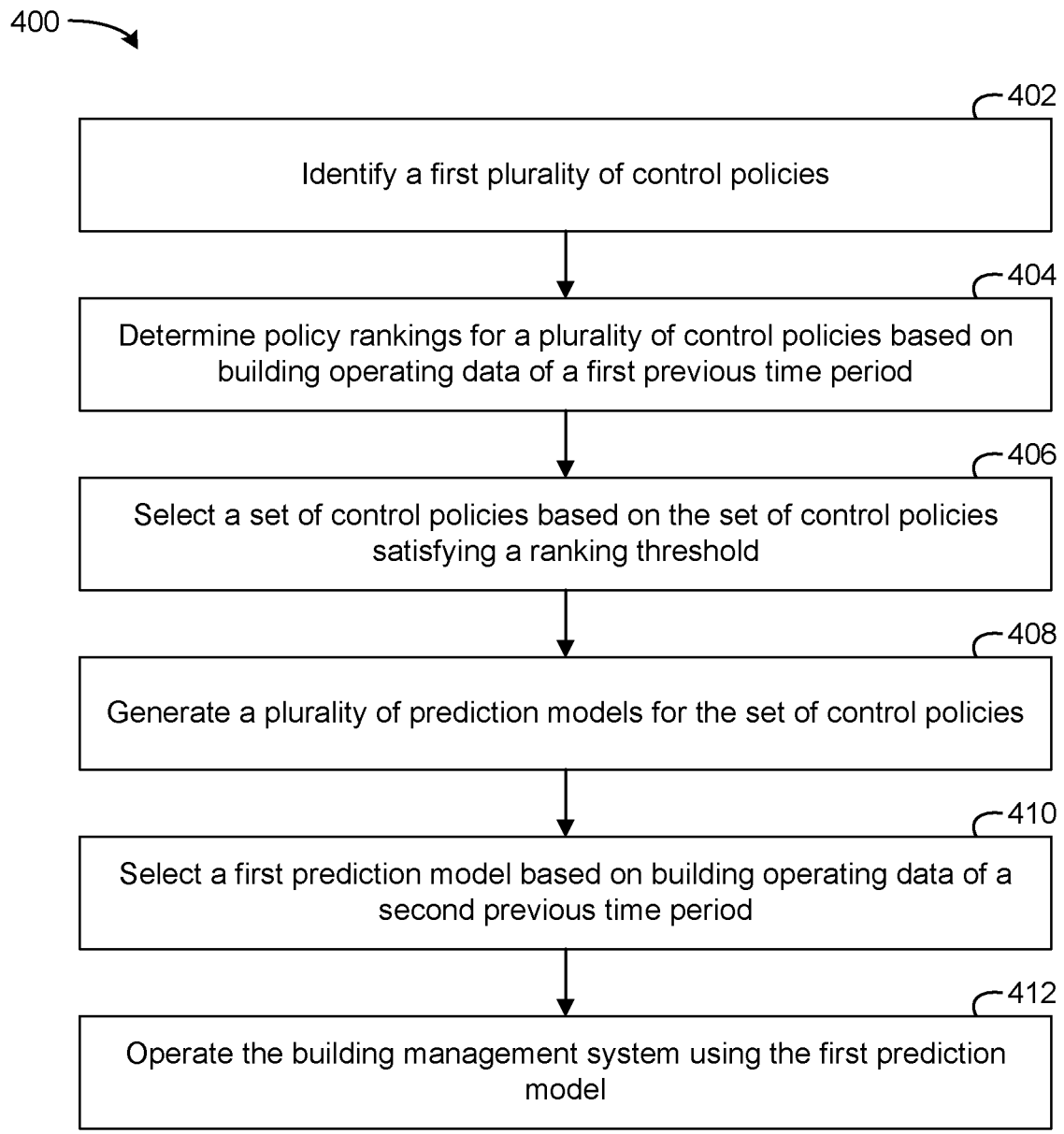
FIG. 4 is a flow diagram of a process for training a prediction model for control of a building management system, according to an exemplary embodiment.

Referring now to FIG. 4, a flow diagram of a process 400 for training a prediction model for control of a building management system is, according to an exemplary embodiment. Process 400 may be performed by a data processing system (e.g., environmental control system 302). Process 400 may include any number of steps and the steps may be performed in any order. At a step 402, the data processing system may identify a first plurality of control policies from a control policy database 322 which includes a repository of control policies. A control policy may be or include a number of state-spaces and/or action-spaces and a set of rules that the data processing system may use to control building equipment. Each control policy may have a different number and/or different variation of state-spaces, in some implementations. A state-space may be an environmental variable parameter such as outside air temperature, occupancy, zone-air temperature, cloudiness, etc. State-spaces may include time-step forecasts for such environmental variables. The forecasts may be obtained from outside data source providers and may be predictions for values of the environmental variables for times into the future. For example, a state-space may have a vector length of four for outside air temperatures forecasts. Such a state-space may include four outside air temperature forecasts into the future. Another state-space may include the current outside air temperature value. In some instances, the current value of the control variable may be included in the forecast state-space. Similarly, a state-space may also include a vector for a number of previous values for a particular environmental variable.

Furthermore, each control policy may have a different number or different variation of action-spaces. An action-space may be a potential action that may be performed based on values of the state-spaces. In the building management system context, for example, an action-space may be a potential zone-air temperature setpoint. Each control policy may have multiple action-spaces. For example, a first control policy may have potential zone-air temperature setpoints of 21, 22, 23, 24, 25, and 26, where 21-26 are degrees in Celsius, and a second control policy may have potential zone-air temperature setpoints of 22, 23, and 24, where 22-24 are degrees in Celsius. However, embodiments are not limited thereto, and the setpoints can be any number. The data processing system may use control policies to determine actions or values for control variables for any point of a building.

At a step 404, the data processing system may determine policy rankings, by for example the policy ranker 314, for a plurality of control policies based on building operation data, from for example the operation data database 334, of a first previous time period. The data processing system may receive building operation data (e.g., building operation data including current values, previous values, and forecasts for various points of a space of the building the data processing system in which the data processing system is operating) of a first previous time period (e.g., that is associated with a time-stamp within the first previous time period) and determine values for control variables of the building management system using each of the control policies. The data processing system may operate the building management system based on the determined values. The data processing system may determine the total energy that the building management system used (or any other performance variable such as comfortability) based on the values for the control variables and store associations between the total energy consumption values and their corresponding output values. The data processing system may maintain a count of the amount of energy each control policy used while it was implemented to operate the building management system.

The data processing system may operate the building management system using each control policy over different time periods (e.g., time periods of five or six months). For example, the data processing system may operate a first control policy from January to June and a second control policy from July to December. During each time period, the data processing system may maintain a counter indicating how much energy the building management system used. The data processing system may do so for any number of control policies and/or for time periods of any length. In some embodiments, instead of operating the building management system in real-time to determine the energy consumption of the control policies, the data processing system may perform simulations with simulated inputs into the control policies to determine how much energy the control policies caused the building management system to consume.

The data processing system may determine the total energy each control policy caused the building management system to consume while it was implemented (or during the simulation) and compare the total energies with each other. The data processing system may rank the control policies in descending order with the control policy that resulted in the least amount of energy being consumed being ranked the highest. For example, if a first control policy is associated with a total energy consumption of 5000 kWh over a fourth month period and a second control policy is associated with a total energy consumption of 6000 kWh over a four-month period, the data processing system may rank the first control policy higher than the second control policy.

In some embodiments, in addition to or instead of using energy consumption, the data processing system may rank the control policies based on a combination of state-space complexity, action-space complexity, and/or reward performance. The data processing system may determine the state-space complexity based on the number of parameters (e.g., environmental variables) that can be input into the respective control policy to determine an output. In some embodiments, a higher number of parameters is associated with a higher complexity. The data processing system may determine the action-space complexity based on the number of potential outputs or actions that the data processing system can determine using the control policy based on a set of inputs. In some embodiments, a higher number of actions may be associated with a higher action-space complexity. Overall reward performance may be any combination of energy consumption, total comfortability, total number of errors (e.g., instances in which a predicted action went outside of a preset range or threshold), etc.

The data processing system may determine policy values for a control policy based on its respective overall reward performance, state-space complexity, and/or action-space complexity. In some embodiments, higher overall reward performance is associated with a higher policy value while higher state-space and/or action-space complexity may be associated with lower policy values. The data processing system may use any rules to determine the policy values based on the overall reward performance, state-space complexity, and/or action-space complexity. The data processing system may determine policy values for any number of control policies.

The data processing system may compare the policy values of the control policies and rank the control policies in descending order. The data processing system may cause the control policies that are associated with the highest policy values to be associated with the highest rankings. The data processing system may rank any number of control policies and store associations between the ranking and the corresponding control policy in a database.

At a step 406, the data processing system may select a set of control policies, for example by the policy selector 316, based on the set of control policies satisfying a ranking threshold. The ranking threshold may be a minimum ranking that the data processing system may select. For example, the data processing system may be configured to rank 10 control policies per above. The ranking threshold may indicate that the data processing system may only select the five highest ranked control policies. Accordingly, the data processing system may select the five highest ranked control policies. In various implementations, the threshold may be a particular numerical threshold, a particular percentage of the policies, a certain number of the policies, or any other threshold.

At a step 408, the data processing system may generate a plurality of prediction models, by for example the model generator 318, for the set of control policies. To do so, the data processing system may identify the state-spaces and/or action-spaces for the control policies of the selected set of control policies. For example, for a first control policy, the data processing system may identify the current outside air temperature value and the five previous outside air temperature values as a state-space or set of state-spaces, the current cloudiness as a state-space, and/or the occupancy as a state-space. The data processing system may also identify zone-air temperature setpoints of the control policy between 21 and 24 (e.g., degrees Celsius). For a second control policy, the data processing system may identify a current outside air temperature value as a state-space and a current cloudiness value as a state-space and zone-air temperature setpoints between 21 and 25 (e.g., degrees Celsius) as action-spaces. The data processing system may identify any number of state-spaces and/or action-spaces of control policies.

The data processing system may generate prediction models such as reinforcement learning models for the set of control policies based on the identified state-spaces and action-spaces. For example, the data processing system may configure one prediction model to have the same state-spaces and action-spaces as one of the selected control policies and another prediction model to have the same state-spaces and action-spaces as another selected control policy. In some embodiments, each prediction model may have the same state-spaces and action-spaces as a corresponding control policy.

At a step 410, the data processing system may select a first prediction model, by for example the model identifier 320, based on building operation data, from for example the operation data database 334, of a second previous time period. The data processing system may implement the prediction models into the building management system separately so each prediction model may receive building operation data and output actions over time. The prediction models may be configured to receive building operation data at predetermined intervals (e.g., 15 minutes) as determined by an administrator and to make an action prediction based on the received building operation data. The data processing system may evaluate the performance of each prediction model by determining comfortability values, energy consumption values, and/or other performance variable values of the building management system based on each or a portion of the actions that the data processing used based on the output of the respective prediction model. The data processing system may do so using simulated data and/or real-time building operation data.

The data processing system may compare the performance variable values of each prediction model and identify the prediction model that is associated with the highest performance variable value. The highest performance variable value may be based on one performance variable or a combination of performance variables (e.g., total energy consumption and average comfortability). For example, the data processing system may identify and/or select the prediction model that caused the building management system to use the least amount of energy or cost the least amount of money. The data processing system may use any method to determine which prediction model is associated with the highest prediction value for selection.

At a step 412, the data processing system may operate the building management system using the first prediction model, for example the inference model 324. The data processing system may input building operation data, from for example the operation data database 334, into the first prediction model according to its state-space and/or action-space configuration. The first prediction model may use its internal weights and/or algorithms to determine an action (e.g., a control variable value) for the building management system. A controller of the building management system may receive or otherwise obtain the output and operate the building management system according to the output.

Accordingly, a method for automatic selection of state-action-spaces for a reinforcement learning agent is provided herein. The method may enable a data processing system to do so using state-spaces and/or action-spaces of known baseline policies by evaluating the performance of the control policies over time and generating prediction models based on the control policies with the highest performance. The method further enables the data processing system to select from a group of prediction models to implement the prediction model with the best performance.

Figure 5:
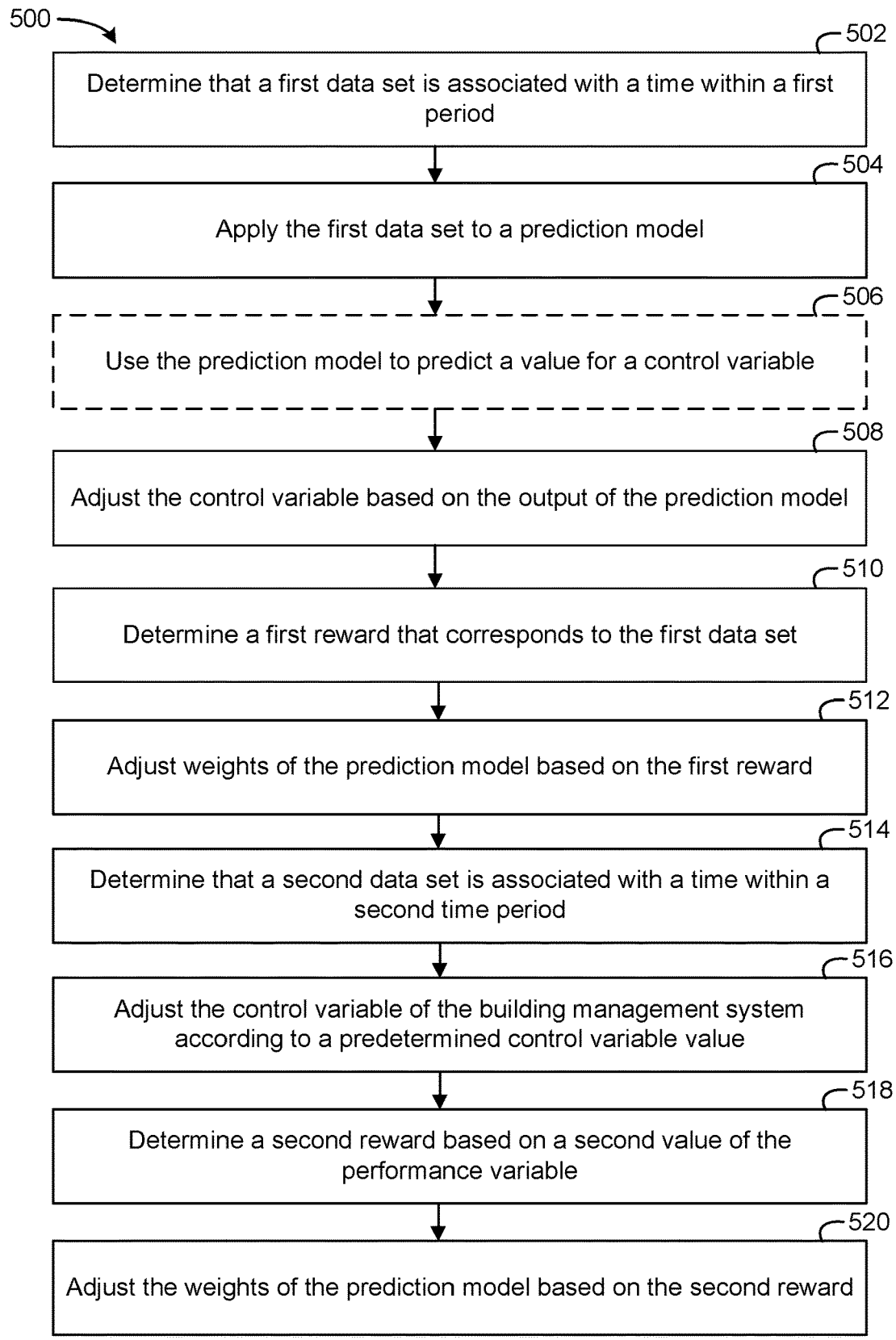
FIG. 5 is a flow diagram of a process for generating a prediction model for control of a building management system, according to an exemplary embodiment.

Referring now to FIG. 5, a flow diagram of a process 500 for generating a prediction model for control of a building management system is shown, according to an exemplary embodiment. Process 500 may be performed by a data processing system (e.g., environmental control system 302). Process 500 may include any number of steps and the steps may be performed in any order. In some embodiments, process 500 may be performed in addition to process 400 by training the selected prediction model according to the steps of process 500. At a step 502, the data processing system may determine that a first data set is associated with a time within a first time period, for example by the time period identifier 332. The data processing system may receive the first data set from building equipment of a building. In some embodiments, the data processing system may retrieve the first data set from a database that stores building operation data (e.g., the operation data database 334). The building operation data may comprise various point values that the data processing system received from various sensors of the building over time. In some embodiments, the building operation data may include forecasts for points such as outside air temperature, cloudiness, etc., that include predicted values for points for time-steps into the future. Such forecasts may be collected from an outside data source. The values of the operation data may be associated with timestamps that indicate when the values were generated by a sensor or received by the data processing system. For forecast values, the timestamps may be associated with times in which the forecasts were made or generated. The data processing system may collect such values at predetermined time intervals (e.g., 15 minutes, 30 minutes, etc.) by automatically receiving the values from the source (e.g., the outside data source or the sensor) or by polling the source at the predetermined time interval.

The data processing system may generate the first data set using the building operation data. The data processing system may do so by identifying the values for the different points of the building that are associated with the same time (e.g., have or are associated with the same timestamp). The first data set may include values for a predetermined list of points or parameters. For example, the first data set may include values that correspond to a state-space of a prediction model (e.g., a reinforcement model). The first data set may include values for points such as outside air temperature forecasts for four time-steps into the future, cloudiness forecasts for four time-steps into the future, current zone-air temperature, current humidity, current occupancy, etc. The first data set may include values for any number of points and/or any number of forecast values for each point.

The data processing system may identify the time associated with the first data set and determine whether the time is within the first time period. The first time period may be a weekly and/or daily periodic time period. The first time period may be associated with times in which a building is likely to be occupied. For example, for an office building, the first time period may be from 8 AM to 5 PM Monday through Friday. The first time period may be associated with any times or range of times as configured by an administrator. The data processing system may compare the timestamps of the data of the first data set to the first time period to determine if the first data set is within the first time period.

At a step 504, the data processing system may apply the first data set to a prediction model, for example the inference model 338. The data processing system may do so responsive to determining the first data set is within the first time period. The prediction model may be a reinforcement learning model with a list of hyper-parameters, from for example the model manager 336. In some embodiments, the prediction model may include or be a neural network with an input layer, one or more hidden layers, and an output layer, where the input layer includes state inputs to the model and the output includes nodes for different potential actions (e.g., different potential zone-air temperature setpoints). The hyper-parameters may define the prediction model by defining its inputs, possible outputs, and how the prediction model is structured. For example, the hyper-parameters may include a number of actions, a length of outside air temperature forecast vector, a length of cloudiness forecast vector, a network architecture (e.g., a number of hidden layers and/or number of nodes of each hidden layer), a batch size, an experience buffer size, a learning rate, and/or a reward scaling factor. An administrator may adjust the hyper-parameters via a user interface. In some embodiments, the hyper-parameters for the prediction model may also include a normalized power threshold for a demand charge penalty (i.e., in cases in which the prediction model takes demand charge into account when determining a correct action). The power threshold may be any value as configured by an administrator. The data processing system may apply the first data set to the prediction model to determine an output as an action (e.g., a new setpoint) for a controller to use to control the building management system.

At a step 506, the data processing system may use the prediction model, for example the inference model 338, to predict a value for a control variable. The control variable may be any point of the building (e.g., zone-air temperature setpoint, pressure setpoint, humidity setpoint, etc.). The prediction model may be configured or trained to identify a value for the control variable to minimize the electricity usage of the building management system throughout the day. In some embodiments, the prediction model may be configured to do so while minimizing the electricity costs which can be incurred based on a demand charge, total amount of electricity used, and/or time-based pricing changes that are based on peak-electricity usage across customers of the utility provider that provides the electricity. The prediction model may be trained to do so while maintaining the comfortability level of the building inside a pre-determined range. The prediction model may be trained to generate control variable outputs to "pre-cool" the building during the off-peak times and/or times in which the outside air temperature is lower or predicted to be lower in its forecast values. The prediction model may additionally or instead be trained to pre-cool the building before the occupancy of the building increases and/or the costs of doing so would be high.

The prediction model may receive the first data set as an input and identify the state of the building by identifying the values of the first data set (including any forecast values depending on the configuration of the prediction model). The prediction model may use its internal weights and algorithms to output an action (e.g., a zone-air temperature setpoint), by for example the action processor 340.

At a step 508, the data processing system may adjust the control variable based on the output of the prediction model. The data processing system may identify the output (e.g., the output action) of the prediction model and adjust the building management system accordingly. For example, the data processing system may identify a new setpoint of 23 degrees Celsius while operating at 25 degrees Celsius. The data processing system may update (or transmit instructions to a controller to update) the HVAC system (e.g., the AHU, VAV boxes, etc.) to decrease the setpoint of the building from 25 degrees Celsius to 23 degrees Celsius accordingly. The data processing system may make any adjustments to the building management system based on outputs from the prediction model. In some embodiments, the adjustments may be made to a simulated system.

At a step 510, the data processing system may determine a first reward, by for example the reward analyzer 342, that corresponds to the first data set. The data processing system may determine the first reward based on a value of a performance variable (e.g., energy expended) that was used based on the adjustment to the control variable. In one embodiment, to determine the reward, the data processing system may use the following equation:

$$\text{Reward} = E - \frac{\lambda}{(C - \text{total current power consumption} + \text{constant})^{exponent}}$$

where E may be an electricity usage based reward, C may be the current monthly peak energy consumption, $\lambda$ may be a predetermined constant, The Electricity Usage Based Reward may be determined based on the following equation:

$$E = -1 * \text{electricity price} * \text{power consumption}$$

Lambda, the exponent, and the constant may be predetermined values as configured by an administrator. E may be the electricity usage based reward and C may be the current monthly peak energy consumption. The data processing system may retrieve the electricity price, current monthly peak energy consumption, the total current power consumption, and the power consumption from an external database or a database internal to the data processing system. The reward may be configured to reward actions (e.g., adjustments) that lead to power consumption that is less than the current monthly peak energy consumption, while penalizing power consumption that is closer to the current monthly peak energy consumption.

In one embodiment, the data processing system may use the following equation to determine the reward:

Reward=Electricity Usage Based Reward−fixed penalty (if normalized power consumption exceeds the threshold)

The threshold and the fixed penalty may be predetermined values as configured by an administrator. In this embodiment, the reward may be configured to reward actions that may lead to normalized power consumption that does not exceed a fixed threshold.

In some embodiments, the reward may further be based on a coefficient. An equation illustrating this relationship is reproduced below:

Reward=Coefficient*(Electricity Usage Based Reward–fixed penalty) (if normalized power consumption exceeds threshold)

The coefficient may be determined based on whether the data set is associated with a peak energy consumption time or an off-peak energy consumption time. For example, the data processing system may determine a coefficient for a peak energy consumption time to be higher than a coefficient for an off-peak energy consumption time. Accordingly, the data processing system may provide higher rewards for control variable values that were determined during a peak energy consumption time than an off-peak energy consumption time.

At a step 512, the data processing system may adjust weights of the prediction model, by for example the weight adjuster 344, based on the first reward. The data processing system may use the reward as determined above and the state-spaces and action-spaces that the reward was determine based on to adjust the weights of the prediction model. The data processing system may adjust the weights proportional to the reward. For example, responsive to the prediction model outputting an output associated with a high reward, the data processing system may adjust the weights so the prediction model is more likely to predict a similar output for the same or a similar set of inputs in the future. On the other hand, responsive to the prediction model outputting an output associated with a low reward (or a penalty), the data processing system may adjust the weights so the prediction model is less likely to predict a similar output for the same or a similar set of inputs in the future. In some embodiments, outputs associated with low rewards (or penalties) may correspond to smaller adjustments than outputs associated with high rewards.

At a step 514, the data processing system may determine that a second data set is associated with a time within a second time period. The second data set may include values for the same or similar points and/or forecasts as the first data set. The second time period may be or include times that are not within the first time period. In some embodiments, the second time period may be associated with times in which a building is not likely to be occupied. For example, for a home, the second time period may include times between 12 PM and 9 PM Mondays through Thursday, 12 PM to midnight on Friday, and all day Saturday. The second time period may be associated with any times. The data processing system may collect data for the second data set similar to how the data processing system collected data for the first data set. The data processing system may determine the second data set is associated with a time within the second time period by comparing the timestamps of the data of the second data set to the second time period. In some embodiments, the first time period may be associated with off-peak electricity usage time period while the second time period may be associated with peak electricity usage time periods.

At a step 516, the data processing system may adjust the control variable of the building management system according to a predetermined control variable value. The data processing system may do so responsive to determining the second data set is associated with a time within the second time period. The predetermined control variable value may be a value stored in an action processor of the data processing system. The predetermined control variable value may be stored in any database of the data processing system. The predetermined control variable value may be configured by an administrator. In some embodiments, the predetermined control variable value may correspond to a boundary of allowable controllable variable values. For example, in some embodiments, the data processing system may be configured to only let zone-air temperature values be between 22 degrees Celsius and 26 degrees Celsius. During the summer, the data processing system may cause the predetermined control variable value to be 26 degrees Celsius and during the winter, the data processing system may cause the predetermined control variable value to be 22 degrees Celsius because the data processing system may have to do less work to heat the building during the summer and keep the building cool during the winter. The control variable values may be any value, within any boundary, and be for any control variable. The data processing system may adjust the components of the building management system based on the predetermined control variable value.

At a step 518, the data processing system may determine a second reward based on a second value of the performance variable. The data processing system may determine the second value for the performance variable (e.g., total energy consumption) by polling or retrieving data indicating the value for the performance variable once the building equipment was adjusted based on the predetermined control variable value. The data processing system may determine the second reward using methods similar to the above. At a step 520, the data processing system may adjust the weights of the prediction model based on the second reward. The data processing system may adjust the weights for the prediction model in a similar manner to the above.

Figure 6A:
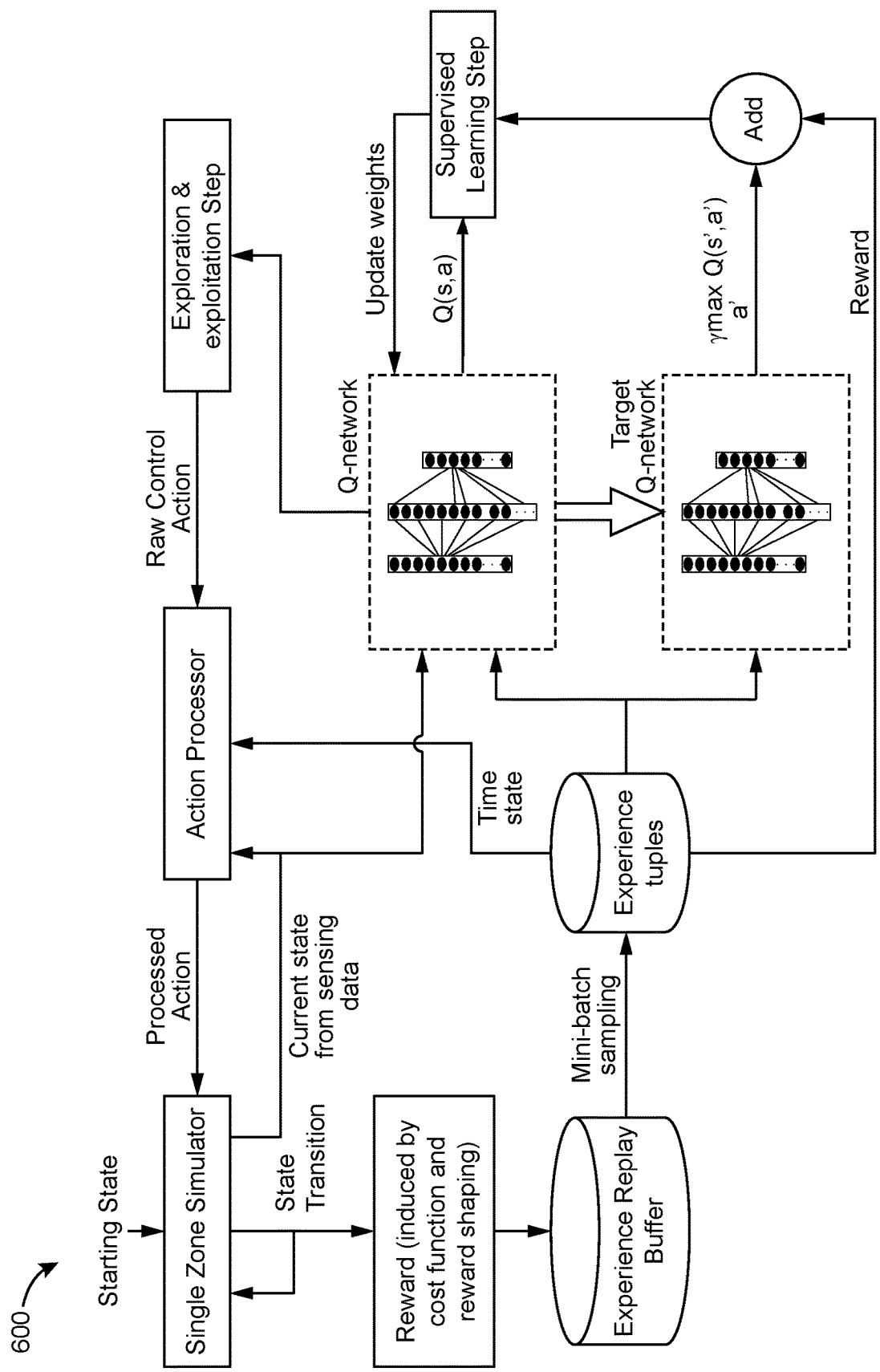
FIG. 6A is a block diagram of a reinforcement learning system, according to an exemplary embodiment.

Referring now to FIG. 6A, a block diagram of a reinforcement learning system 600 is shown, according to an exemplary embodiment. The reinforcement learning system 600 may be part of or an implementation of environmental control system 302. A prediction model of the reinforcement learning system 600 may be trained with data gathered from the first few months and stored in the experience buffer. In some instances, for a given set of hyper-parameters, it was found that the Q-learning did not always converge smoothly to know exactly when to stop the training. To get a good set of trained weights, the reinforcement learning system 600 may save ten instances of the Q-network weights at different points during the late stage of training. The reinforcement learning system 600 may choose the "best" set of weights (e.g., highest performing or weights that resulted in the best performance variable value) and deploy the model with the best set of weights for the remainder of the evaluation duration.

In some instances, to gather more exploratory data covering the state-space, data from a time period of three months or more (or any other time period) may be used, to choose random setpoints within the comfort range of 22° C. to 24° C. during occupied times and 20° C. to 26° C. during unoccupied times. Consequently, the data processing system may collect more exploratory data to help the prediction model (e.g., RL agent) learn better while at the same time potentially ensuring that the occupants are not inconvenienced too much as the data processing system maintains the setpoints within the comfort bounds.

In some embodiments, the data processing system may choose a set of weights among several sets of weights that may be expected to perform best when exposed to unseen data. This may be beneficial in a model-free RL framework, for example, because the data processing system may not have access to an external simulator or model to evaluate a set of weights against the model. In one approach, the data processing system may select the best model is to deploy a frozen set of weights for a period of 3 months and repeat this for each set of weights and pick the best performing weights for the remainder of the evaluation duration. In another approach, the data processing system could build a simple linear prediction model with the first 3 months of data and use this model to simulate an environment that can be used to select the best performing model. In another approach, the data processing system may compute the TD errors for all the experiences in the experience buffer for the different sets of weights and choose that set that contributes to the lowest sum of TD errors.

Figure 6B:
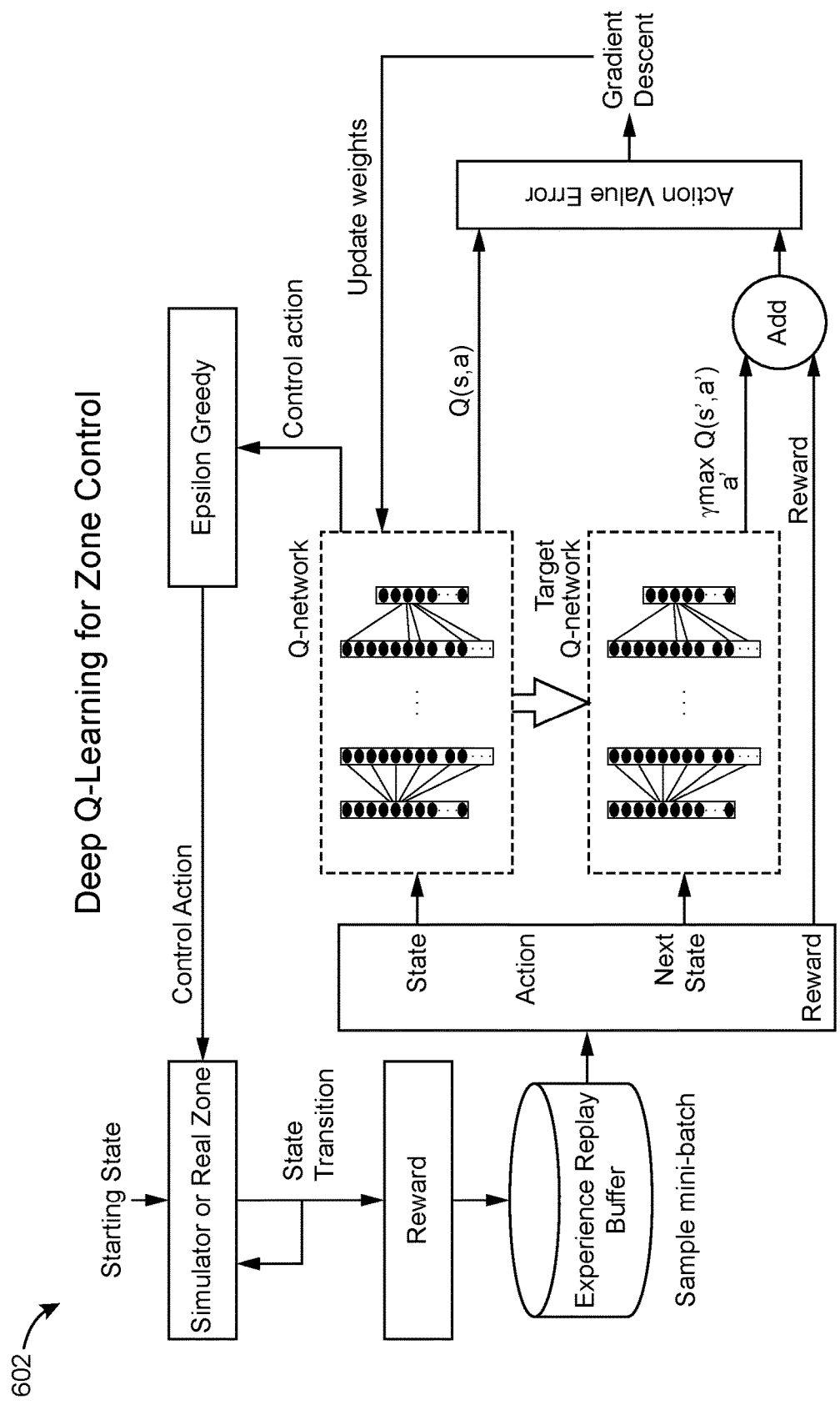
FIG. 6B is a block diagram of another reinforcement learning system, according to an exemplary embodiment.

Referring now to FIG. 6B, a block diagram of another reinforcement learning system 602 is shown, according to an exemplary embodiment. Reinforcement learning system 602 may operate similar to reinforcement learning system 600.

Figure 7:
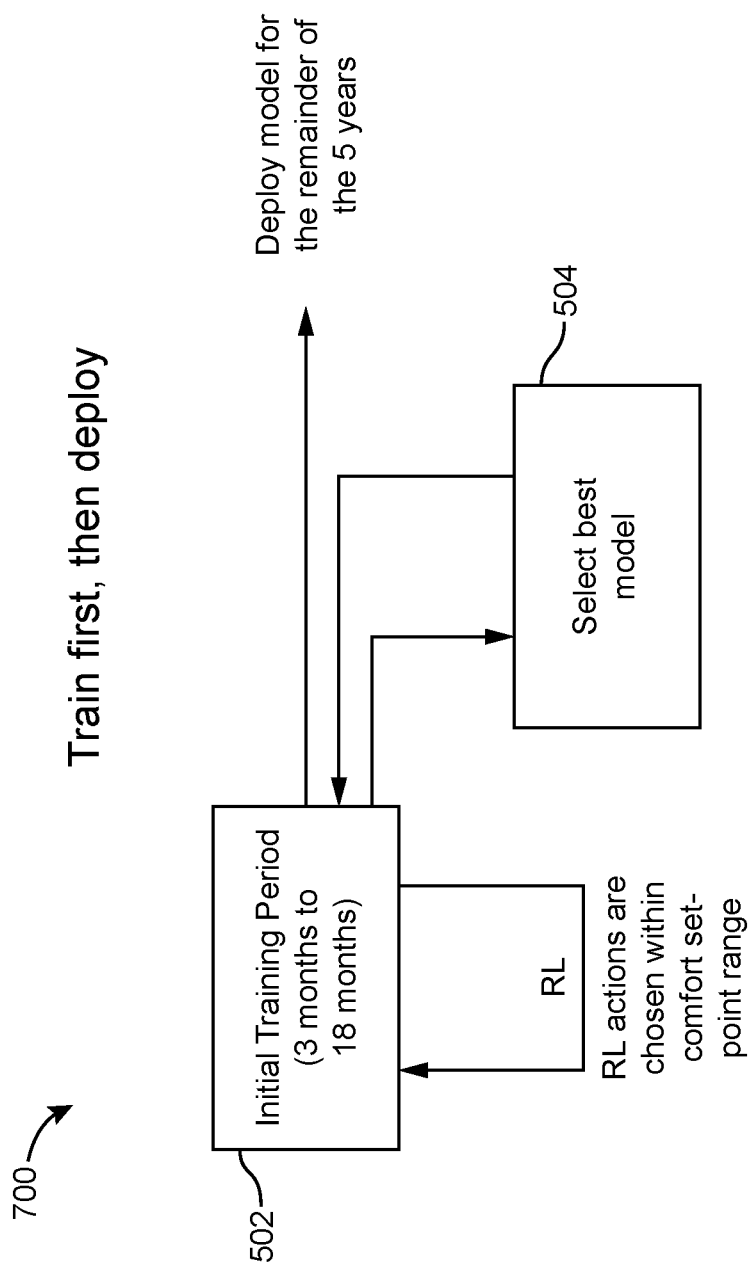
FIG. 7 is a block diagram of a model training system, according to an exemplary embodiment.

Referring now to FIG. 7, a block diagram of a model training system 700 is shown, according to an exemplary embodiment. The data processing system may train the Deep Q-Network (DQN) with data gathered from the first few months (e.g., six months to one year for the results shown in this report) and stored in the experience buffer, save ten instances of weights at different points during the training cycle, and use a model selector to choose the "best" set of weights and deploy the model for the remainder of the evaluation duration.

Figure 8:
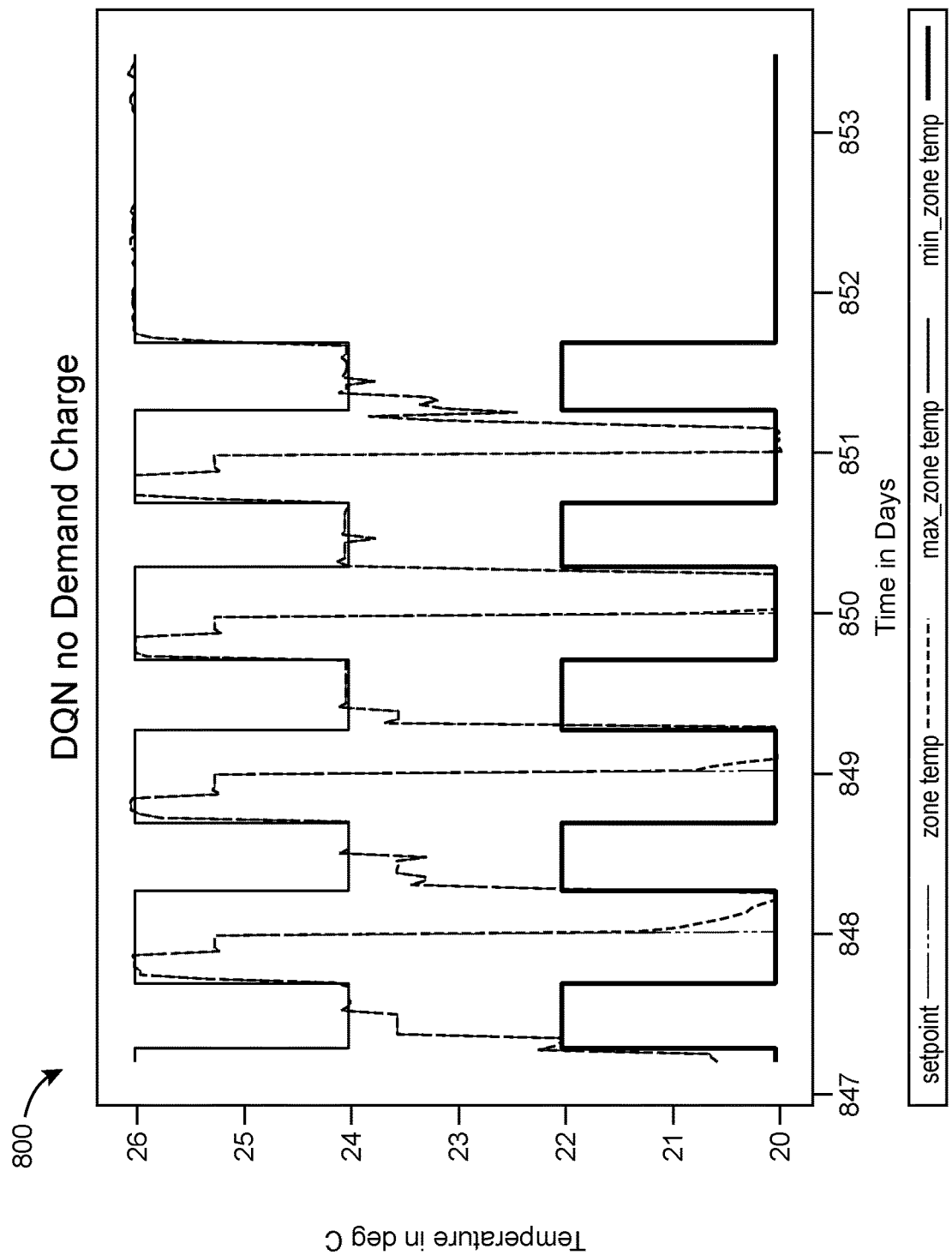
FIG. 8 is a graph of zone-air temperature of a building management system over time with no demand charge, according to an exemplary embodiment.

Referring now to FIG. 8, a graph 800 of zone-air temperature of a building management system over time with no demand charge is shown, according to an exemplary embodiment.

Figure 9:
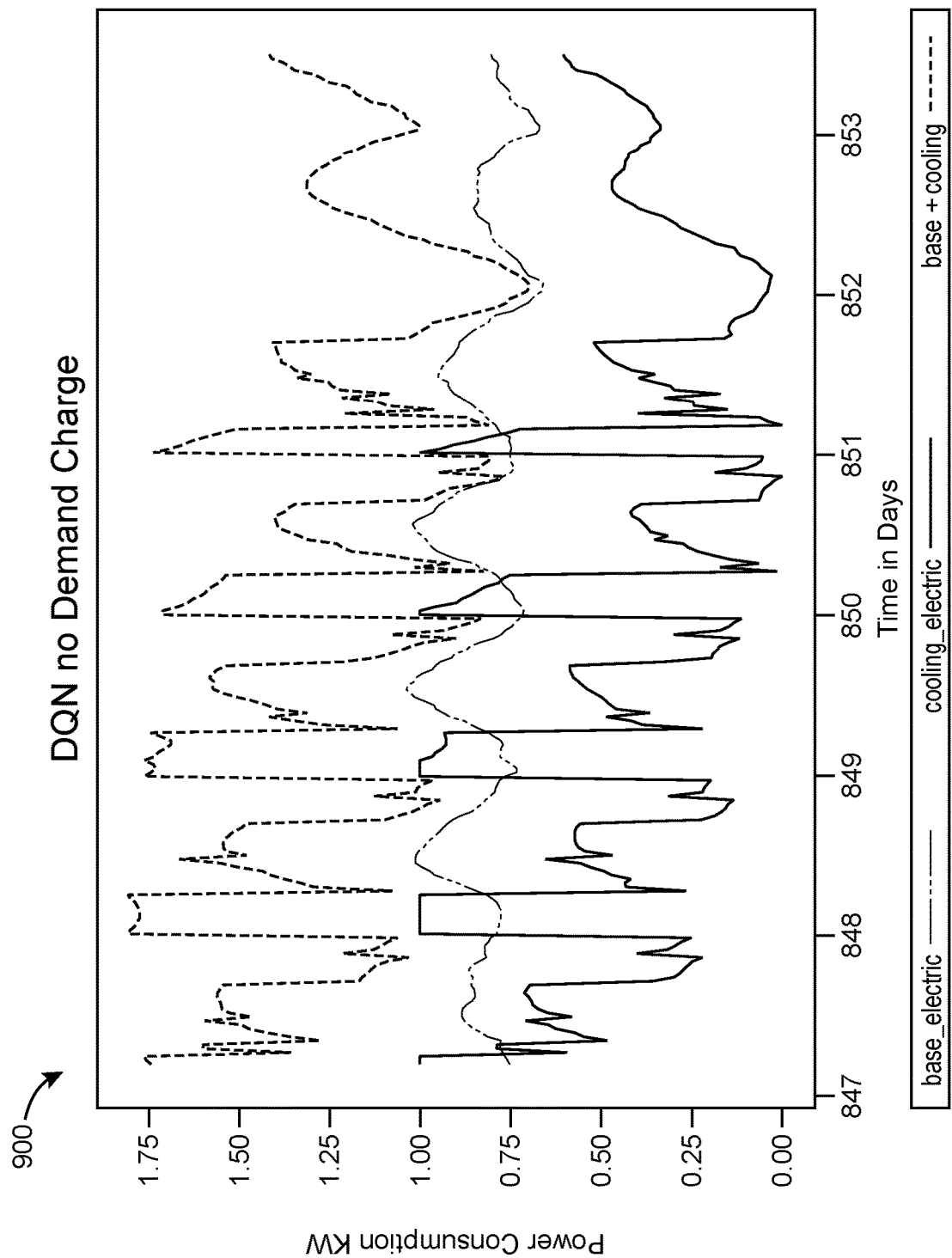
FIG. 9 is a graph of power consumption of a building management system over time with no demand charge, according to an exemplary embodiment.

Referring now to FIG. 9, a graph 900 of power consumption of a building management system over time with no demand charge is shown, according to an exemplary embodiment.

Figure 10:
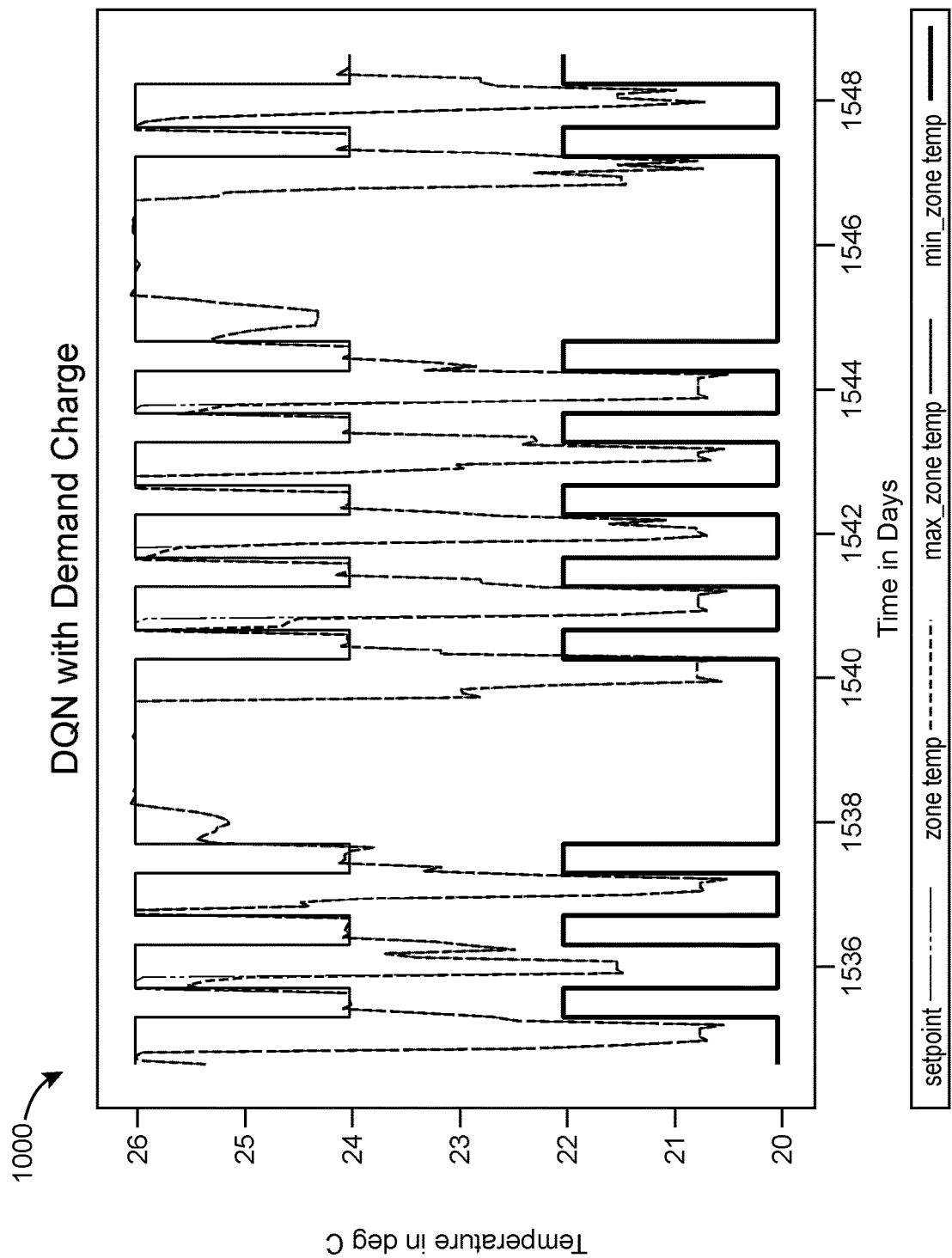
FIG. 10 is a graph of zone-air temperature of a building management system over time with demand charge, according to an exemplary embodiment.

Referring now to FIG. 10, a graph 1000 of zone-air temperature of a building management system over time with demand charge is shown, according to an exemplary embodiment.

Figure 11:
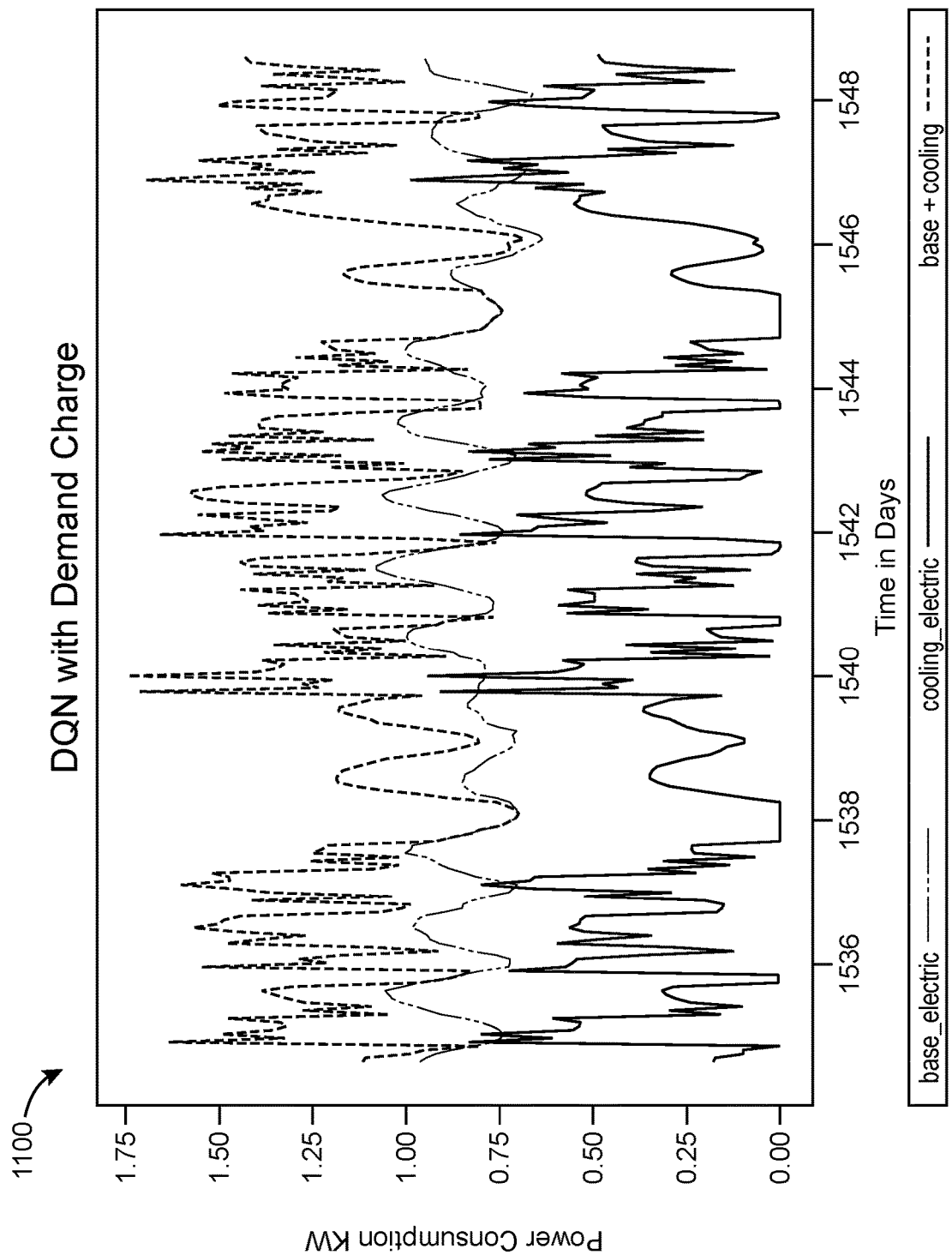
FIG. 11 is a graph of power consumption of a building management system over time with demand charge, according to an exemplary embodiment.

Referring now to FIG. 11, a graph 1100 of power consumption of a building management system over time with demand charge is shown, according to an exemplary embodiment.

Figure 12:
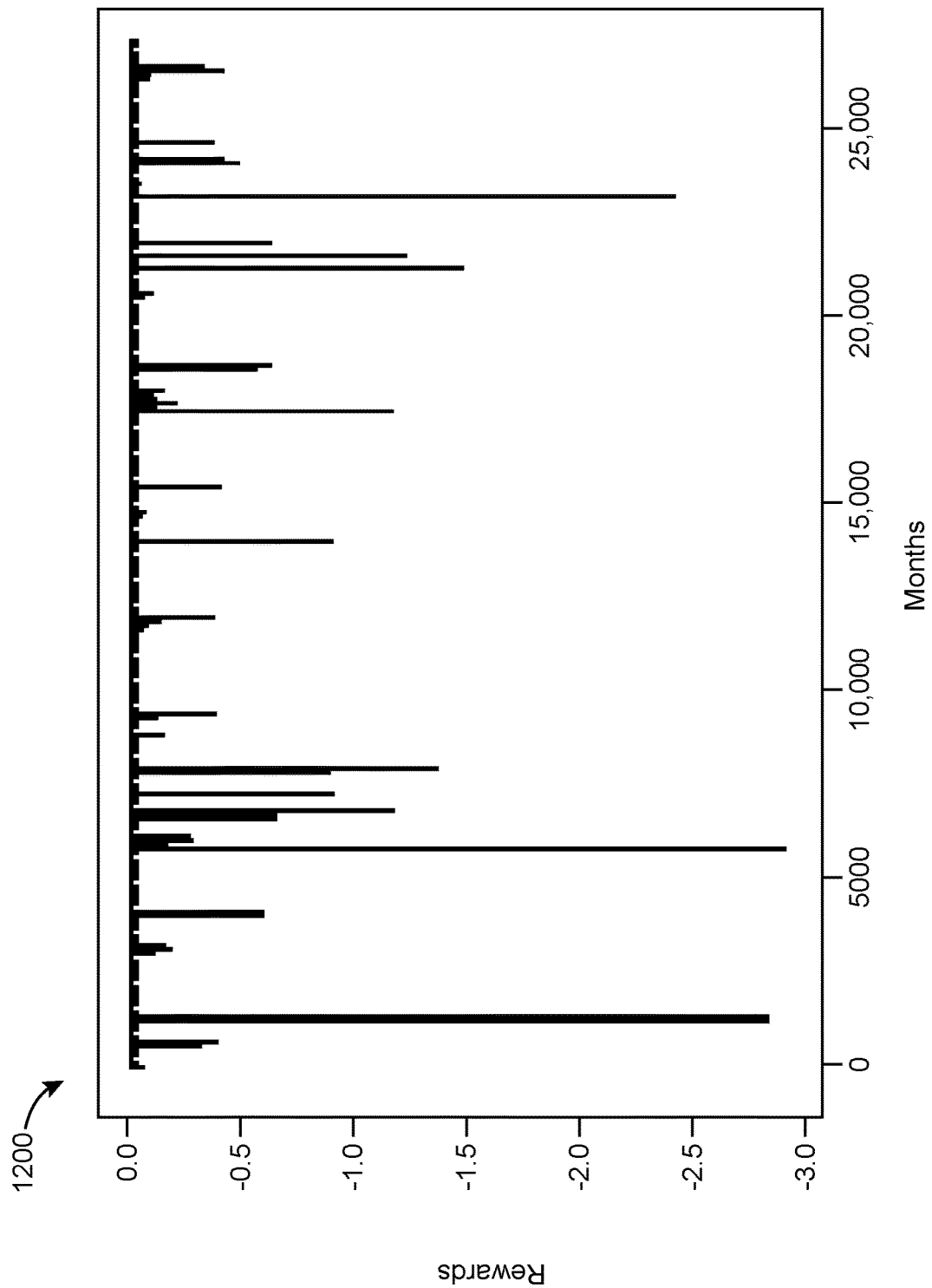
FIG. 12 is a graph of rewards for a reinforcement learning model over time, according to an exemplary embodiment.

Referring now to FIG. 12, a graph 1200 of rewards for a reinforcement learning model over time is shown, according to an exemplary embodiment.

Reinforcement Learning

A detailed description of the reinforcement learning process described above is provided below, in accordance with example implementations. Energy efficiency remains a significant topic in the control of building heating, ventilation, and air-conditioning (HVAC) systems, and diverse set of control strategies have been developed to optimize performance, including recently emerging techniques of deep reinforcement learning (DRL). While most existing systems focus on minimizing energy consumption, the generalization to energy cost minimization under time-varying electricity price profiles and demand charges has rarely been studied. Under these utility structures, significant cost savings can be achieved by pre-cooling buildings in the early morning when electricity is cheaper, thereby reducing expensive afternoon consumption and lowering peak demand. However, correctly identifying these savings requires planning horizons of one-day or more. The systems and methods described herein provide a (DQN) with an action processor, defining the environment as a Partially Observable Markov Decision Process (POMDP) with a reward function consisting of energy cost (time-of-use and/or peak demand charges) and a discomfort penalty, which may be an extension of most reward functions used in existing DRL works in this area. Moreover, the systems and methods provide for a reward shaping technique to overcome the issue of reward sparsity caused by the demand charge. The systems and methods further provide for a double DQN with a simplified state representation that includes only the time of day, which may help the agent learn more efficiently. The customized DQN described herein has been shown to outperform baseline rule-based policies by saving around 6% of total costs.

Furthermore, commercial buildings have been found to account for over 20% of the total energy consumption in the U.S. Particularly, about 40% to 50% of such consumption may be mainly attributed to the heating, ventilation, and air-conditioning (HVAC) systems. Thus, energy efficiency remains a significantly critical topic and effective control and maintenance strategies for operating HVAC systems. Traditionally, simple rule-based and feedback controls such as on-off control or PID control have been used to control the indoor environment based on different time and occupancy schedules. However, these two categories of controllers may result in sub-optimal performance due to lack of predictive information on external disturbances such as weather and occupancy.

Systems that do not use the methods described herein may implement model predictive control (MPC) as a control strategy to tackle such issues by iteratively conducting online optimization over a receding time horizon. The performance of MPC may highly rely on the accuracy of the model as well as the robustness of the online optimization. The key challenge may be balancing the tradeoff between model accuracy and computational tractability. On the one hand, smaller linear models may be preferable for optimization as they may lead to convex optimal control problems that can be solved efficiently, but they may be unable to accurately model particular buildings. On the other hand, larger nonlinear models may accurately describe building dynamics, but optimizers tend to struggle to find globally optimal solutions to the resulting nonconvex optimal problems.

Another emerging technique that has received considerable attraction is reinforcement learning (RL), which may be a learning-based optimal control policy design method by the direct interaction with the environment. Additionally, due to the promising performance of deep learning (DL), RL has been integrated with DL to pave the way to solve the high-dimension sequential decision-making or continuous control problems such as in games, robotics and autonomous driving, which were difficult for tabular RL. While by leveraging deep reinforcement learning (DRL), many works have shown the feasible applications to the building HVAC optimal controls, the sample complexity still remains a significant issue to be addressed.

Due to the time-varying electric price profiles (with different on-peak/off-peak prices), energy cost rather than consumption has been more interesting to commercial buildings, and how to minimize it while maintaining comfort requirements may be a more challenging problem. Moreover, the cost caused by the peak electric demand, i.e., the so-called demand charge, may further increase the difficulty of the optimal controller design in building HVAC systems.

The systems and methods described herein may take into consideration practical scenarios where most key states may not be fully observable and/or the environment may be defined as a POMDP instead of an MDP. The systems provide a model-free DRL approach, a Deep Q-Network (DQN) with an action processor that enables the optimal control action in a critically safe set, given only a limited amount of historical data and a user-defined comfort bound, to minimize the time-of-use cost and demand charge. The systems also provide a reward shaping technique to overcome the issue of the reward sparsity caused by the demand charge. With a customized training method by using a model selector to choose the best weight, DQN may perform robustly and continue to improve the episodic performance on temperature regulation and cost saving and the processor to improve the control action of the building management system. The system described herein may implement a state-space simplification that includes only the time of day. The system may also adopt a double DQN algorithm that helps the agent learn more efficiently.

To evaluate the performance of the proposed DQN, a single-zone building simulation platform with a local PI controller regulating the zone temperature may be adopted accordingly as the environment of a data processing system. The data processing system may use a 5-year period (including training and testing) for the evaluation. For external disturbances, the outdoor environment generated by the typical meteorological year (TMY) data and occupancy patterns may be into account. As a supervisory controller, DQN may be a first trained offline with a limited amount of historical data and then be tested online for the rest of the period. Comparing it to the baseline method (a rule-based policy) based on the total energy cost saving to be around 6%, while performing sufficient precooling for the zone to avoid the high cost due to the on-peak price and the reduction on the monthly peak electric demand. Moreover, the data processing system may run additional simulation experiments only considering the time of day. The results of such experiments show that the double DQN with the simplified state representation may be able to outperform the DQN in terms of the cost saving as well as the learning efficiency, which implies that the definition of the system's state-space has a significant effect on performance.

Energy Cost in HVAC

By implementing the systems and methods described herein, the data processing system may minimize the energy cost while maintaining comfort requirements. The data processing system may do so while avoid the high cost caused by the peak electric demand. This problem has been recognized difficult yet practically useful since for most commercial buildings, utility companies charge their peak demands daily or monthly typically.

Preliminaries

POMDP

Model-free RL approaches may obtain their optimal control policies generically through their interaction with the environment, where the full states of the system can be provided or even determined. For example, the Markov property rarely holds in real world environments. Therefore, such a process can be represented by a POMDP, which may better capture the dynamics of the building HVAC system through only the observations of the agent that may be viewed as the partial information of the underlying system states. Specifically, it can be summarized as a 7-tuple $\langle \Sigma, A, T, R, \Omega, O, \gamma \rangle$:

S is a finite set of states
A is a finite set of actions
T is state transition probability matrix such that $T_{ss'}^a = P[S_{t+1}=s'|S_t=s, A_t=a]$
R is a reward function, $R_s^a = E[R_{t+1}|S_t=s, A_t=a]$
$\Omega$ is a finite set of observations
O is an observation model such that $O_{as'}^o = P[O_{t+1}=o|S_{t+1}=s', A_t=a]$
$\gamma$ is a discount factor such that $\gamma \in [0, 1]$.

At an arbitrary time step t, a prediction model or agent selects an action $A_t=a$ given the current state $S_t=s$. When the action a may be executed in the environment, the current state may be transmitted to the next state $S_{t+1}=s'$ according to the state transition dynamics shown above such that the agent observes $O_{t+1}=o$. Finally, a reward $R_{t+1}=r$ may be received by the agent by using the reward function. Typically, T and R may be both unknown to the agent. The reward function may only be based on the domain knowledge. DRL aims at searching for an optimal policy that maximizes the cumulative discounted reward, i.e., return, expressed as $G_t = \Sigma_{k=0}^{\infty} R_{t+k+1}$.

Deep Q learning, as a benchmark DRL algorithm, has been adopted in different areas. The parameterized value function by a deep neural network may be called deep Q-network, which outputs the action corresponding to the maximum of Q value via updating the value function of state-action pairs. In performing the operations described herein, the data processing system may use a state value function and a state action value function. The state value function may be the expected return starting from an arbitrary state: Similarly, $V^\pi(s) = \mathbb{E}[G_t|S_t=s]$. the state-action value function may be defined as $Q^\pi(s, a) = \mathbb{E}[G_t|S_t=s, A_t=a]$. $Q^\pi(s, a) = E[G_t|S_t=s, A_t=a]$. To derive the DQN, the optimal Q value denoted by $Q^*(s, a)$ may be defined as $Q^*(s, a) = \max_\pi E[G_t|S_t=s, A_t=a]$. The state action value function may follow the Bellman equation such that if the optimal value $Q^*(s', a')$ at the next time step was known for all possible actions a', then the optimal control policy selects the action a' that can maximize the expected value of $r + \gamma Q^*(s, a)$. Hence, one can get the following expression for the optimal state action value $$Q^*(s, a) = \mathbb{E}_{s' \sim \varepsilon}\left[r + \gamma \max_{a'} Q^*(s', a') \Big| s, a\right],$$

which may provide an effective estimate of the state action value function. $\varepsilon$ may represent the environment. Additionally, the iterative update of Q value can be obtained by $$Q_{t+1}(s, a) = \mathbb{E}_{s' \sim \varepsilon}\left[r + \gamma \max_{a'} Q_t(s', a') \Big| s, a\right].$$

Generically, the data processing system may use some function estimators, either linear or non-linear, to estimate the state action value function, i.e., $Q(s, a; \theta) \approx Q^*(s, a)$, where $\theta$ represents the estimated parameters. In this context, the data processing system may adopt a nonlinear function estimator, deep neural network with weights $\theta$ as a Q network. To stabilize the training, the data processing system may employ a target network as used in such that the Q network can be trained by minimizing a sequence of loss functions $$L_t(\theta_t) = \mathbb{E}_{s,a\sim\wp(\cdot,\cdot)}\left[(y_t - Q(s, a; \theta))^2\right]$$

$$y_t = \mathbb{E}_{s'\sim\varepsilon}\left[r + \gamma \max_{a'} Q(s', a'; \theta_t^-) \Big| s, a\right],$$

where $\wp(s, a)$ may be a probability distribution over state and action. Such a target work can be copied periodically from the Q network. $\theta_t^-$ may be fixed when optimizing the loss function $L_t(\theta_t)$. To obtain the gradient of $L_t(\theta_t)$ at $\theta_t$, the data processing system may differentiate the loss function and obtain the following $$\nabla L_t(\theta_t) = \mathbb{E}_{s,a\sim\wp(\cdot,\cdot),s'\sim\varepsilon}\left[\left(r + \gamma \max_{a'} Q(s', a'; \theta_t^-) - Q(s, a; \theta_t)\right)\nabla_{\theta_t} Q(s, a; \theta_t)\right].$$

In some embodiments, the data processing system may calculate the stochastic gradient when optimizing the loss function instead of the full expectations.

Double DQN

For the DQN algorithm, the algorithm implies that $\theta_t^- = \theta_t$ since the parameters of the target network may be copied from the online network. Thus, the max operator in DQN uses the same Q value for both selecting and evaluating an action. This can cause the selection of overestimated values, leading to the overoptimistic value estimates. To mitigate such an issue in the original DQN, the data processing system may use two value functions learned by assigning experiences randomly to update one of the two value functions, resulting in two sets of weights, $\theta_t$ and $\theta_t'$, such that $$y_t = \mathbb{E}_{s'\sim\varepsilon}\left[r + \gamma Q\left(s', \operatorname*{argmax}_{a'} Q(s', a'; \theta_t), \theta_t'\right) \Big| s, a\right]$$

where $\theta_t$ still plays a similar role as in DQN to estimate the value of the corresponding policy, $\theta_t'$ may be the second set of weights to evaluate the value of this policy. In this context, $\theta_t'$ can be obtained by directly using the weights from the target network. Therefore, the data processing system can still maximally leverage the original DQN and do a fair comparison, maintaining the minimal computational overhead.

Vanilla Deep Q learning algorithms (either DQN or Double DQN) may not be able to decipher the underlying states of the POMDP as in general estimating a Q value can be arbitrarily bad via an observation due to $Q(s, a; \theta) \neq Q(o, a; \theta)$. Therefore, in this context, the underlying system states may be estimated via sequences of observations such that the gap between $Q(o, a; \theta)$ and $Q(s, a; \theta)$ can be narrowed.

System Description

System Dynamics

The system described herein includes a thermal zone served by a local cooling source that may be controlled by a PI controller and a local thermostat. The thermal zone may receive heat directly from solar radiation, plug loads, and internal occupants, while exchanging heat with the ambient due to the indoor/outdoor temperature difference. In order to maintain constant zone temperature, the amount of cooling must be adjusted by a controller to counteract these heat loads. If the measured zone temperature may be above its current setpoint, the controller may increase the magnitude of cooling until the setpoint may be reached; by contrast, if the zone temperature may be below the setpoint, the controller may not be able to take any direct action and may have to wait for the zone to heat up from the disturbances.

In some instances, the air inside the zone changes temperature much faster than do the zone's solid-mass components (i.e., floor, ceiling, walls, and furniture). This timescale difference can serve as passive energy storage: if the temperature of the solid mass can be pre-cooled by lowering the zone temperature setpoint, the temperature may not need to be cooled to serve the needs of the zone's occupants.

To implement the methods described herein, the data processing system may make use of a simplified zone simulator. Internal to the data processing system, the simulator may model the zone using a second-order linear model, with one state for the (uniform) air temperature in the zone and a second state for the (uniform) temperature of the solid mass surrounding the zone (e.g., walls, floor, ceiling, and internal furniture). Both states may be subject to fixed heat loads due to solar radiation, plug loads, and internal occupants. In addition, they may exchange heat with each other and with the ambient in proportion to temperature differences. To maintain zone-air temperature, a direct cooling load may be applied to the zone-air, the magnitude of which may be controlled by a PI controller to meet the current temperature setpoint. Because the mass-temperature state evolves much more slowly than the air-temperature state, thermal energy can be passively stored by pre-cooling the solid mass, which may then provide a net cooling load to the air space over the next several hours as the mass and air temperatures slowly re-equilibrate. By implementing this simulation model, the data processing system may capture the air/mass timescale separation while also considering the dynamics of local regulatory that may be neglected by more detailed simulators.

Internally, the simulator's time-step may be $\delta = 1$ min. Agents may interact with the simulator by providing a zone temperature setpoint and receiving the current observation, but this interaction loop may occur with a time-step of $\Delta = 15$ min. Thus, the provided setpoints may be held constant for 15 min by the simulator, and the measurements in the observation may be averaged over the same period for consistency. The observation may include the most recent time-step's zone temperature and energy consumption, as well as forecasts (up to 48 h in length) of future ambient temperature, cloudiness, and base building electricity usage. Notably, the observation may not include values of the mass temperature or heat disturbance loads, as these quantities may not be able to be measured. Thus, the system may only be partially observed, and agents may have to infer the effect of these quantities via time correlations and the available measurements. All observed quantities may be subject to random measurement noise with variance and autocorrelation chosen to match that of typical real-world measurements.

Observations

The observation that may be used to estimate the underlying system states may include: T: zone-air temperature; $T_{out}$: outside air temperature; $p_c$: cloudiness; h: time of day; and d: day of week.

Action

The data processing system may only identify actions for a zone temperature setpoint, $T^{sp}$, which may be input to the local PI controller associated with the simplified zone.

Cost Function

The agent may maintain thermal comfort in the zone at a low energy cost. In this context, thermal comfort may be defined as maintaining zone temperature between time-varying temperature bounds $T_t^{min}$ and $T_t^{max}$ which may be set to 22° C. and 24° C. during weekdays from 7 am to 5 pm, with 20° C. and 26° C. at all other times. Due to disturbances, it may not be possible to exactly maintain these bounds, and so the data processing system may have to soften them and penalize their violation as a fictitious comfort cost $$C_{com}^t = \lambda\delta\sum_t \left(\max(T_t - T_t^{max}, 0) + \max(T_t^{min} - T_t, 0)\right)$$

in which $T_t$ may be the zone-air temperature (with t representing the simulator's time-step), and $\lambda=0.1\$/°$ Ch.

Energy cost may be calculated on a monthly basis as the sum of use charges and peak demand charges. Use charges may be given by $$C_{use}^t = \delta\sum_t p_t W_t$$

in which $p_t$ may be the (known) time-varying electricity price (in \$/kWh) and $W_t$ may be the average building electric power (in kW) over time period t. The peak demand charge may then be calculated as $$C_{dem}^t = p_D \max_t \left(\frac{1}{15}\sum_{t'=t}^{t+14} W_{t'}\right)$$

Here, $p_D$ may be the monthly demand price (in \$/kW), and the monthly peak may be the maximum average power over any 15-minute interval in the month. Two different cases for the prices $p_t$ and $p_D$ may be as follows:

With demand charge $$-p_t = \begin{cases} 0.07842 \$/kWh & \text{weekdays 9am to 9pm} \\ 0.05622 \$/kWh & \text{otherwise} \end{cases}$$

$$-p_D = 15.65 \$/kW$$

Without demand charge $$-p_t = \begin{cases} 0.20101 \$/kWh & \text{weekdays 9am to 9pm} \\ 0.09137 \$/kWh & \text{otherwise} \end{cases}$$

$$-p_D = 0 \$/kW$$

The first case may incentivize load flattening (via the demand charge), while the second case may more strongly incentivize load shifting.

As an extra source of complication, the total building power may be calculated as $W_t = \eta q_t + W_t^0$ in which $q_t$ may be the zone cooling load, which may be (indirectly) controllable by the agent, and $W_t^0$ may be the base electricity load of the building due to lighting and plug loads, which may be constant regardless of the agent's actions. Note that $\eta$ may be a scale factor (i.e., the inverse of coefficient of performance) to convert from thermal cooling load to the corresponding electricity consumption, and it may be assumed to be constant for simplicity. For the use charge, the $W_t^0$ term may not matter very much because it increases the monthly use charge by a fixed amount. However, for the demand charge, the term may provide extra flexibility, because the agent can fill in the nightly troughs of $W_t^0$ with additional $q_t$ without increasing the overall demand charge. The data processing system may compute $q_t$ by subtracting the hypothetical monthly electricity cost assuming constant $q_t=0$.

Rule Based Policies

To assess the performance of the RL policies, the data processing system may compare to two rule-based policies that may correspond to a fixed weekly set-point schedule. The first policy may attempt to minimize instantaneous energy consumption at all times by keeping the setpoint as high as possible, with some minor dynamic adjustments to avoid comfort violations. The schedule may be generated as follows, with t representing the slower agent time-step (i.e., $\Delta=15$ min):

Calculate the target setpoint $T_t^* := \min_{t'=t,\ldots,t+3} T_{t'}^{max}$.
If $T_t^* \leq T_{t-1}^{sp}$, set $T_t^{sp} = T_t^*$; otherwise, set $T^{sp} = (T_{t-1}^{sp} + T_t^*)/2$ Here, the target setpoint $T_t^*$ may give the most stringent upper comfort limit over the next hour. If this target is lower than the previous setpoint, the policy may step immediately to the target to ensure the system has sufficient time to reach it. However, if the target is higher than the previous setpoint, the setpoint may be increased only halfway to the target, which may avoid comfort violations due to controller overshoot, which could occur if the setpoint were increased directly to the target. The "Baseline" policy may be largely representative of typical building operation, with minor additional complexity to avoid comfort penalties (which would complicate cost analysis).

Because the previous baseline policy may make no attempt to leverage peak/off-peak electricity price difference, An alternative algorithm may be used. The algorithm may be as follows:

If $\rho_t$ is at its high value, set the target setpoint to $T_t^* := \min_{t'=t,\ldots,t+3} T_{t'}^{max}$; otherwise, set the target setpoint to $T_t^* := \max_{t'=t,\ldots,t+3} T_{t'}^{min}$
Set the setpoint to $T_t^{sp} := 0.65 T_t^* + 0.35 T_{t-1}^{sp}$ In words, when electricity is cheap, the data processing system may move the setpoint towards its lowest comfortable value, while when electricity is expensive, the data processing system may move the setpoint to its highest comfortable value. This policy may cause the mass temperature to be significantly reduced overnight, thus reducing the cooling load needed to maintain a comfortable air temperature during the day by serving as a heat sink. The data processing system may refer to this policy as "Aggressive Pre-Cooling," as it may represent the maximum possible amount of pre-cooling without violating comfort bounds.

While DRL may be a very powerful general paradigm to learn to look ahead and try to maximize future rewards, the current training algorithms and techniques may be in practice constrained by lack of availability of large amount of training samples (that span across different states and actions), imperfect reward assignment schemes (assigning appropriate rewards and penalties for actions taken in different states) and the length of the reward horizon (the longer the horizon, the less effect a future reward has on the Q-network's learning in the current state).

The data processing system may address this technological problem for HVAC control deployment. In some applications of RL, hundreds of thousands, if not millions of samples may used to train the Q-network. One way to get this amount of data samples may be to build a good model of the building and extract samples to train. However, this method may not be scalable and may be hard to deploy across building. Thus, by implementing the systems and methods provided herein, the data processing system may create training data sets assuming constant setpoint measurements (conventional rule-based setpoint values) for a two-month period (or any time period), followed by the above mentioned one month of random setpoint exploration. After the third month, the data processing system may incur high cost penalties to the applicable agent or prediction model.

Customized DQN

The DQN may implement an action processor to train the Network. The action processor may require the time information (e.g., weekday or weekend, morning or afternoon) to process the raw action delivered by the Q-network in either the training or testing phase. For the Q-network model, as the convergence of deep Q learning algorithm still remains an open problem, the data processing system may use a model selector to obtain the best weights. Reward shaping may be mainly developed to overcome the issue of reward sparsity caused by the demand charge due to its monthly signal.

Action Processor

Given the limited amount of data available and other constraints mentioned above regarding training DRL, it becomes important to utilize any prior information that may be available to try to improve the performance of the Q network. The prior information taken into account to facilitate the learning consists of more peak hours appearing when the electric price is high and those times to allow trivially setting temperature setpoints to upper comfort bounds, which motivates the development of an action processor. Let $a_t$ denote the raw control action output by the agent at time step t. By combining the baseline policy and denoting the processed action as $\hat{a}_t$, $\hat{a}_t$ may be set to $T_t^{sp}$ for times that will be specified in experiments; otherwise $\hat{a}_t = a$. This action processor can be used both while training the Q-network as well as during inference.

Reward Shaping

According to the cost function shown, the reward (negative cost) comprises three parts, the comfort cost $C_{com}^t$, use charge $C_{use}^t$, and demand charge $C_{dem}^t$, for each time step t. The demand charge corresponds to the peak power consumption at any time during a month. Since this may be a rare occurrence, coming up with a reward scheme for an RL agent to learn to penalize this demand charge may be difficult. The reward scheme has to penalize this rare charge while encouraging actions that lead to lower power consumption. FIG. 12 illustrates an instance plot for the reward signal for nine consecutive months and the spikes in it correspond to the times when the demand charge term may be dominant. In some instances, associating a reward that penalizes just this one spike may be not enough to make the RL agent learn well to reduce the demand charge. Thus, a few other few reward shaping techniques may be used, including prioritized experience replay, dual-experience replay buffers, reward-valley-penalize-peak, and reward-below-threshold. Different techniques can lead to different performance improvement and the reward-below-threshold approach may enable the most significant improvement over the baseline method. Intuitively, it may be to reward the actions that would lead to normalized power consumption that does not exceed a fixed threshold, which can be expressed $$r = -(\zeta(C_{com}^t + C_{use}^t) + c1(\Delta W_{t,nor}))$$

Where $\zeta$ may be a scaling factor, c may be the pre-defined large penalty constant, $1(\Delta W_{t,nor})$ may be an indicator function such that if $\Delta W_{t,nor} > 0$, $1(\Delta W_{t,nor}) = 1$; if $\Delta W_{t,nor} \leq 0$, $1(\Delta W_{t,nor}) = 0$, $\Delta W_{t,nor} = W_{t,nor} - \overline{W}_{nor}$, $W_{t,nor}$ may be the normalized demand or power consumption, and $\overline{W}_{nor}$ may be the threshold.

Model Selector

To get a good set of trained weights for the Q-network, the data processing system may use a model selector to choose the "best" set of weights obtained during the training phase and deploy the model in the evaluation phase. This may be because the deep Q learning did not always converge smoothly and know exactly when to stop the training. Due to lack of theoretical foundation, such a topic has rarely been investigated in different applications of deep Q learning. The role of a model selector may be to choose a set of weights among several sets of weights that may be expected to perform best when exposed to unseen data. One can leverage different schemes to achieve that, depending on various scenarios. In this paper, empirically, the data processing system may select the best model using an instance of the simulator and evaluating the different set of weights on this simulated environment.

Simulation Experiment

Simulation Testbed

The data processing system may make use of a simplified zone simulator developed for this work. Internally, the simulator may model the zone using a second-order linear model, with one state for the (uniform) air temperature in the zone and a second state for the (uniform) temperature of the solid mass surrounding the zone (e.g., walls, floor, ceiling, and internal furniture). Both states may be subject to fixed heat loads due to solar radiation, plug loads, and internal occupants. In addition, they exchange heat with each other and with the ambient in proportion to temperature differences. To maintain zone-air temperature, a direct cooling load may be applied to the zone-air, the magnitude of which may be controlled by a PI controller to meet the current temperature setpoint. Because the mass-temperature state evolves much more slowly than the air-temperature state, thermal energy can be passively stored by pre-cooling the solid mass, which will then provide a net cooling load to the air space over the next several hours as the mass and air temperatures slowly re-equilibrate. Although this simulation model may be simple, by using the simulation model, the data processing system may capture the air/mass timescale separation while also considering the dynamics of local regulatory that may be neglected by more detailed simulators. In addition, its simplicity allows actions to be computed by means of a convex optimization problem, which may provide valuable insight into how and to what extent energy cost can be reduced.

Internally, the simulator's time-step may be S=1 min. Agents interact with the simulator by providing a zone temperature setpoint and receiving the current observation, but this interaction loop occurs with a time-step of Δ=15 min. Thus, the provided setpoints may be held constant for 15 min by the simulator, and the measurements in the observation may be averaged over the same period for consistency. The observation may include the most recent time-step's zone temperature and energy consumption, as well as forecasts (up to 48 h in length) of future ambient temperature, cloudiness, and base building electricity usage. Notably, the observation may not include values of the mass temperature or heat disturbance loads, as, in some instances, these quantities cannot be measured. Thus, the system may only be partially observed, and agents may have to infer the effect of these quantities via time correlations and the available measurements. All observed quantities may be subject to random measurement noise with variance and autocorrelation chosen to match that of typical real-world measurements.

Observations

The observations that may be used to estimate the underlying system states include: T: zone-air temperature; Tout: outside air temperature; pc: cloudiness; h: time of day; d: day of week.

Action

In some embodiments, the only action the data processing considers may be zone temperature setpoint, $T^{sp}$, which may be input to the local PI controller associated with the simplified zone.

Cost Function

The overall goal of each agent may be to maintain thermal comfort in the zone at the lowest energy cost. In this context, thermal comfort may be defined as maintaining zone temperature between time-varying temperature bounds $T_t^{min}$ and $T_t^{max}$, which may be set to 22° C. and 24° C. weekdays 7 am to 5 pm, with 20° C. and 26° C. at all other times. Due to disturbances, it may not be possible to exactly maintain these bounds, and so the data processing system may soften them and penalize their violation as a fictitious comfort cost $$C_{com}^t = \lambda \delta \sum_t \left( \max(T_t - T_t^{max}, 0) + \max(T_t^{min} - T_t, 0) \right)$$

in which $T_t$ may be the zone-air temperature (with t representing the simulator's time-step), and λ=0.1 $/° Ch.

Energy cost may be calculated on a monthly basis as the sum of use charges and peak demand charges. Use charges may be given by $$C_{use}^t = \delta \sum_t p_t W_t$$

in which $p_t$ may be the (known) time-varying electricity price (in $/kWh) and $W_t$ may be the average building electric power (in kW) over time period t. The peak demand charge may be then calculated as $$C_{dem}^t = p_D \max_t \left( \frac{1}{15} \sum_{t'=t}^{t+14} W_{t'} \right)$$

Here, $p_D$ may be the monthly demand price (in $/kW), and the monthly peak may be the maximum average power over any 15-minute interval in the month. In some instances, the following two cases for the prices and $p_D$ may be used:

With demand charge $$-\rho_t = \begin{cases} 0.07842 \, \$/kWh & \text{weekdays 9am 9pm} \\ 0.05622 \, \$/kWh & \text{otherwise} \end{cases}$$

$$-\rho_D = 15.65 \, \$/kW$$

Without demand charge $$-\rho_t = \begin{cases} 0.20101 \, \$/kWh & \text{weekdays 9am to 9pm} \\ 0.09137 \, \$/kWh & \text{otherwise} \end{cases}$$

$$-\rho_D = 0 \, \$/kW$$

The first case may generally incentivize load flattening (via the demand charge), while the second case may more strongly incentivize load shifting.

As an extra source of complication, the total building power may be calculated as $W_t = \eta q_t + W_t^0$ in which $q_t$ may be the zone cooling load, which may be (indirectly) controllable by the agent, and $W_t^0$ may be the base electricity load of the building due to lighting and plug loads, which may be constant regardless of the agent's actions. Note that η may be a scale factor (i.e., the inverse of coefficient of performance) to convert from thermal cooling load to the corresponding electricity consumption, and may be assumed to be constant for simplicity. For the use charge, the $W_t^0$ term may not matter very much, as it simply increases the monthly use charge by a fixed amount. However, for the demand charge, the term provides extra flexibility, as the agent can fill in the nightly troughs of $W_t^0$ with additional $q_t$ without increasing the overall demand charge. Note, however for the purposes of analysis, the data processing system may only use the cost associated with the controllable action $q_t$, which may be computed by subtracting the hypothetical monthly electricity cost assuming constant $q_t=0$.

Rule Based Policies

To assess the performance of the RL policies, the data processing system may compare two simple rule-based policies that correspond to a fixed weekly set-point schedule. The first policy may attempt to minimize instantaneous energy consumption at all times by keeping the setpoint as high as possible, with some minor dynamic adjustments to avoid comfort violations. The schedule may be generated as follows, with representing the slower agent time-step (i.e., Δ=15 min):

Calculate the target setpoint $T_t^*:=\min_{t'=t,\ldots,t+3} T_{t'}^{max}$.
If $T_t^* \leq T_{t-1}^{sp}$, set $T_t^{sp}=T_t^*$; otherwise, set $T^{sp}=(T_{t-1}^{sp}+T_t^*)/2$ Here, the target setpoint $T_t^*$ gives an upper comfort limit over the next hour. If this target may be lower than the previous setpoint, the policy steps immediately to the target to ensure the system has sufficient time to reach it. However, if the target is higher than the previous setpoint, the setpoint may be increased only halfway to the target, which avoids comfort violations due to controller overshoot, which could occur if the setpoint were increased directly to the target. This may be a "Baseline" policy, as it may be largely representative of typical building operation, with minor additional complexity to avoid comfort penalties.

Because the previous baseline policy makes no attempt to leverage peak/off-peak electricity price difference, the data processing may instead use the following algorithm:

If $\rho_t$ is at its high value, set the target setpoint to $T_t^*:=\min_{t'=t,\ldots,t+3} T_{t'}^{max}$; otherwise, set the target setpoint to $T_t^*:=\max_{t'=t,\ldots,t+3} T_{t'}^{min}$
Set the setpoint to $T_t^{sp}:=0.65 T_t^* + 0.35 T_{t-1}^{sp}$ In words, when electricity is cheap, the data processing system may move the setpoint towards its lowest comfortable value, while when electricity is expensive, the data processing system may move the setpoint to its highest comfortable value. This policy causes the mass temperature to be significantly reduced overnight, thus reducing the cooling load needed to maintain a comfortable air temperature during the day by serving as a heat sink. This policy may be called "Aggressive Pre-Cooling," as it may represent the maximum possible amount of pre-cooling without violating comfort bounds.

Information Policy

As mentioned above, the relatively simple structure of the simulation model means that the data processing system can determine an optimal behavior of the system by solving an optimal control problem with knowledge of disturbances. Because the system model may be linear and the cost function may be convex, the data processing system can employ convex programming techniques to find global solutions for each month. In particular, by considering entire months within the same optimization, the peak demand charge may be perfectly managed, as the optimizer may be able to choose a single monthly peak demand target and stick to it throughout the entire month. Of course, because this policy requires values of the internal system parameters, it may not be achievable in practice. Nevertheless, it may provide key insights into problem structure to help guide tuning of other techniques and serve as an ideal benchmark to which all policies should strive. It may also provide a lower bound on system cost, which may not be available had the data processing system used a more complicated simulator.

Results

This section presents the simulation results based on the simulator described above. Specifically, the data processing system may use the zone-air temperature regulation using the proposed method and the corresponding energy consumption. Then, the data processing system can compare the proposed method with the rule-based and optimal policies in terms of energy cost savings. In addition, the effect of state-space may be empirically shown on the performance. A table for some hyperparameter settings is as follows. In Table 1, the lengths for the forecasts of $T_{out}$ and $p_c$ and $T^{max}$ & $T^{min}$ may be all 48, which signifies the number of future time steps. As each time step is 15 min the horizon for the forecast is 6 hours.

A table of the hyper-parameters that were used to generate the results is reproduced below.

| Hyper-Parameter | Value |
| --- | --- |
| Number of DQN actions | 9 |
| Length of OAT forecast vector | 48 |
| Length of Cloudiness forecast vector | 48 |
| Length of minimum zone temperature | 48 |
| Length of maximum zone temperature | 48 |
| Batch size | 128 |
| Experience buffer size | 200000 |
| Optimizer and learning rate | RMS prop, 0.0003 |
| Normalized power threshold for demand charge penalty | 0.6 |
| Reward scaling factor | 0.2 |

The number of the agent actions in the table is set to 9, which corresponds to 9 discrete values in the range between 20° C. and 26° C. for unoccupied periods and 22° C. and 24° C. for occupied periods.

Comparison

According to the problem assumption, the total simulation period may be 5 years and the limited historical data available to the data processing system for training may be three months along with only one month of exploratory data. The policy trained using this dataset may be "DQN 1". To gather more exploratory data covering the state-space, the data processing system may use data from beyond the first three months if needed to collect more exploratory data to help the RL agent learn better while at the same time attempting to ensure that the occupants may be not inconvenienced too much as building continues to stay within the comfort bounds. Hence, the data processing system can collect three more months of exploratory data such that the training data last six months with four months of exploration. This policy may be "DQN 2".

The comparison results between different methods may be listed in the table below. Using the baseline policy as the benchmark, the data processing system can determine from the table that the DQN 2 may be able to save around 6% of total energy cost and that either DQN 1 or 2 outperforms the aggressive pre-cooling policy significantly. This may be attributed to the maximum possible amount of pre-cooling without making any attempt to manage peak demand in the aggressive pre-cooling policy. In contrast, DQN policies may be able to manage reasonably well the time to pre-cool the zone in the early morning when electricity is cheaper, thereby reducing expensive afternoon consumption and lowering peak demand.

On the other hand, without taking into account demand charges, in the table below, the data processing system may determine that the aggressive pre-cooling policy outperforms the DQN 1 and such a result may not be surprising because the pre-cooling policy may consider on-peak/off-peak price differences more exhaustively than the latter. However, the DQN 1 can still maintain over 5% of total cost saving over the baseline. Another noticeable difference may be that the optimal policy saves less energy cost without demand charges, which indicates the significance of lowering peak demand as the main attribution to the total energy cost saving. A table illustrating the performance with/without demand charges during the testing phase may be shown below.

| Method | WITH | WITHOUT |
|---|---|---|
| Baseline | — | — |
| Aggressive | 0.72% ± 3.20% | 11.96% ± 1.98% |
| DQN 1 | 4.93% ± 0.78% | 5.21% ± 1.75% |
| DQN 2 | 5.75% ± 0.87% | — |
| Optimal | 22.88% ± 2.70% | 16.30% ± 1.60% |

During weekends (Day 1538-1540 & 1545-1547), there may be small drops for the temperature setpoint during the unoccupied periods, which may increase moderately the power consumption. Another phenomenon may be that the temperature regulation may suffer from some unexpected noise to result in spikes in power consumption. Such agent behaviors may be caused by the unstable convergence of DQN, though they may not have a significantly negative impact on the overall control performance. One can observe that compared to the case with demand charges, the pre-cooling may be more aggressive without considering any charges on peak demand as the temperature setpoint may be directly set to the lower comfort bound, and the overall zone-air temperature regulation may be relatively easier.

Impact of Hyper-Parameters

Hyper-parameters may play a role in obtaining optimal model architectures and training performance. The hyper-parameters described herein may have been manually tuned by an administrator. The experience buffer size may be also a key factor to the final training performance as leveraging past experiences avoids oscillations or divergence in the parameters. In addition, the batch size and optimizer & learning rate have moderate impact on the DQN training with a slight improvement tuning them. The reward scaling factor and threshold may be two other hyper-parameters that may be important to the performance since they shapes the appropriate reward function in this study, especially with the presence of demand charges. A larger $\overline{W}_{nor}$ close to 1 may be difficult for the agent to reduce the peak demand. Lastly, though a larger number of agent actions enables the design of policy close to be continuous, this may not be necessary in an optimal sense with time-varying electricity prices. Since after the zone has been maintained to a comfort level, the data processing system (or the agent) may determine for the setpoint to approach the upper comfort limit to reduce energy consumption and more discrete actions increase the computational complexity.

Advantageously, the systems and methods described herein can save energy cost while maintaining the comfortability of a building compared to two practical rule-based policies.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system, comprising:
one or more memory devices configured to store instructions thereon that, when executed by one or more processors, cause the one or more processors to:
determine policy rankings for a plurality of control policies based on building operation data of a first previous time period;
select a set of control policies from among the plurality of control policies based on the policy rankings of the set of control policies satisfying a ranking threshold;
generate a plurality of prediction models for the set of control policies;
select a first prediction model of the plurality of prediction models based on building operation data of a second previous time period; and responsive to selecting the first prediction model, operate the building management system using the first prediction model.

2. The building management system of claim 1, wherein the plurality of prediction models includes reinforcement learning models, and wherein the plurality of control policies includes one or more state-spaces for the reinforcement learning models.

3. The building management system of claim 2, wherein the one or more state-spaces includes one or more of outside air temperature, occupancy, zone-air temperature, or cloudiness.

4. The building management system of claim 2, wherein the state-spaces include time-step forecasts for environmental variables.

5. The building management system of claim 2, wherein the plurality of control policies includes one or more action spaces, and wherein the one or more action-spaces includes one or more of a potential zone-air temperature setpoints.

6. The building management system of claim 1, wherein the policy rankings are determined based on a total amount of energy consumption over the first previous time period.

7. The building management system of claim 1, wherein the policy rankings are determined based on a total amount of money spent on operating building equipment over the first previous time period.

8. The building management system of claim 1, wherein the selecting the building operation data is based on one or both of simulated data or real-time building operation data.

9. A method for generating a prediction model for control of a building management system, comprising:
   determining, by a processing circuit, policy rankings for a plurality of control policies based on building operation data of a first previous time period;
   selecting, by the processing circuit, a set of control policies from among the plurality of control policies based on the policy rankings of the set of control policies satisfying a ranking threshold;
   generating, by the processing circuit, a plurality of prediction models for the set of control policies;
   selecting, by the processing circuit, a first prediction model of the plurality of prediction models based on building operation data of a second previous time period; and
   responsive to selecting the first prediction model, operating, by the processing circuit, the building management system using the first prediction model.

10. The method of claim 9, wherein the plurality of prediction models includes reinforcement learning models,
   wherein the plurality of control policies includes one or more state-spaces for the reinforcement learning models, and
   wherein the policy rankings is determined based on a combination of state-space complexity, action-space complexity, and/or reward performance.

11. The method of claim 10, wherein a higher number of parameters used to determine the one or more state spaces corresponds to a greater state-space complexity, and wherein a higher number of actions corresponds to a greater action-space complexity.

12. The method of claim 10, wherein a higher reward performance is based on one or more of energy consumption, total comfortability, or total number of errors.

13. The method of claim 9, wherein the plurality of control policies include known baseline policies.

14. The method of claim 9, wherein the building operation data includes one or more of current values, previous values, or forecasts for various points of a space of a building operatively connected to the processing circuit.

15. The method of claim 14, wherein the building operation data includes total energy consumption or average comfortability.

16. A building management system, comprising:
   building equipment operatively connected to one or more processors; and
   one or more memory devices configured to store instructions thereon that, when executed by the one or more processors, cause the one or more processors to:
      determine policy rankings for a plurality of control policies based on building operation data of a first previous time period;
      select a set of control policies from among the plurality of control policies based on the policy rankings of the set of control policies satisfying a ranking threshold;
      generate a plurality of prediction models for the set of control policies;
      select a first prediction model of the plurality of prediction models based on building operation data of a second previous time period; and
      responsive to selecting the first prediction model, operate the building equipment using the first prediction model.

17. The building management system of claim 16, wherein the plurality of prediction models includes reinforcement learning models, and wherein the plurality of control policies includes one or more state-spaces for the reinforcement learning models.

18. The building management system of claim 17, wherein the one or more state-spaces includes one or more of outside air temperature, occupancy, zone-air temperature, or cloudiness.

19. The building management system of claim 17, wherein the state-spaces include time-step forecasts for environmental variables.

20. The building management system of claim 17, wherein the plurality of control policies includes one or more action spaces, and wherein the one or more action spaces includes one or more of a potential zone-air temperature setpoints.

* * * * *